(12) United States Patent
Maeshima

(10) Patent No.: US 12,024,814 B2
(45) Date of Patent: Jul. 2, 2024

(54) SLEEVE-FOLDING ASSISTANCE DEVICE FOR ASSISTING BACK-REVEALING SLEEVE-FOLDING DEVICE, AND FOLDING DEVICE

(71) Applicant: TOTOFOLDER MANUFACTURING CO., LTD., Saitama (JP)

(72) Inventor: Yusuke Maeshima, Saitama (JP)

(73) Assignee: TOTOFOLDER MANUFACTURING CO., LTD., Saitama (JP)

( * ) Notice: Subject to any disclaimer, the term of this patent is extended or adjusted under 35 U.S.C. 154(b) by 796 days.

(21) Appl. No.: 17/058,633

(22) PCT Filed: May 28, 2018

(86) PCT No.: PCT/JP2018/020366
§ 371 (c)(1),
(2) Date: Nov. 24, 2020

(87) PCT Pub. No.: WO2019/229807
PCT Pub. Date: Dec. 5, 2019

(65) Prior Publication Data
US 2021/0207316 A1 Jul. 8, 2021

(51) Int. Cl.
*D06F 89/02* (2006.01)
*B65G 47/34* (2006.01)

(52) U.S. Cl.
CPC .......... *D06F 89/023* (2013.01); *B65G 47/34* (2013.01); *B65G 2201/0229* (2013.01)

(58) Field of Classification Search
CPC . B65G 47/34; B65G 2201/0229; D06F 89/02; D06F 89/023
See application file for complete search history.

(56) References Cited

U.S. PATENT DOCUMENTS 2,362,976 A * 11/1944 Cooper .................. D06F 89/02
493/405
2,508,108 A * 5/1950 Gayring ................. D06F 89/02
223/37

(Continued)

FOREIGN PATENT DOCUMENTS

| JP | 2004159726 | 6/2004 |
| JP | 2009213553 | 9/2009 |

(Continued)

OTHER PUBLICATIONS

"International Search Report (Form PCT/ISA/210) of PCT/JP2018/020366," mailed on Jul. 24, 2018, with English translation thereof, pp. 1-3.

(Continued)

*Primary Examiner* — F Griffin Hall
(74) *Attorney, Agent, or Firm* — JCIPRNET

(57) ABSTRACT

A sleeve-folding assistance device for assisting a back-revealing sleeve-folding device is provided. The sleeve-folding assistance device includes a pair of right and left sleeve guide portions which disposes a body portion of a garment having the body portion and both sleeve portions on a loading conveyor to transport the garment from a front to a rear, and moves to approach both sides of the loading conveyor so as to guide both sleeve portions of the garment hung down on both sides of the loading conveyor to a sleeve-folding device for performing back-revealing sleeve-folding, in which when the pair of right and left sleeve guide portions approaches both sides of the loading conveyor and transports the body portion from the front to the rear on the loading conveyor, the pair of right and left sleeve guide portions lifts both sleeve portions of the garment, respectively.

5 Claims, 25 Drawing Sheets

(56) References Cited

U.S. PATENT DOCUMENTS

| | | | | |
|---|---|---|---|---|
| 2,616,594 A | * | 11/1952 | Calder | D06F 89/023 223/37 |
| 2,616,595 A | * | 11/1952 | Arruda | D06F 89/023 223/37 |
| 2,629,519 A | * | 2/1953 | Neckel | D06F 89/023 223/37 |
| 2,629,521 A | * | 2/1953 | Johnson | D06F 89/023 223/37 |
| 3,013,704 A | * | 12/1961 | Freeman | D06F 89/023 223/37 |
| 3,161,333 A | * | 12/1964 | Lew | D06F 89/023 223/37 |
| 3,181,747 A | * | 5/1965 | Lucius | D06F 89/023 223/37 |
| 3,419,199 A | * | 12/1968 | Lornitzo | D06F 89/026 223/52.1 |
| 3,514,020 A | * | 5/1970 | Lornitzo | D06F 89/026 223/52.1 |
| 3,774,903 A | * | 11/1973 | Sjoman | B65B 25/20 493/428 |
| 3,828,989 A | * | 8/1974 | Heater | D06F 89/02 223/37 |
| 3,920,237 A | * | 11/1975 | Grantham | D06F 89/02 493/938 |
| 5,074,444 A | * | 12/1991 | Cooper | D06F 89/023 223/37 |
| 5,862,525 A | * | 1/1999 | Tankersley | D06F 89/02 2/243.1 |
| 2017/0159232 A1 | * | 6/2017 | Kitagawa | D06F 89/02 |

FOREIGN PATENT DOCUMENTS

| | | |
|---|---|---|
| JP | 2009213554 | 9/2009 |
| JP | 2009254674 | 11/2009 |
| JP | 2014188064 | 10/2014 |

OTHER PUBLICATIONS

"Search Report of Europe Counterpart Application", issued on Dec. 2, 2021, p. 1-p. 7.

* cited by examiner

SLEEVE-FOLDING ASSISTANCE DEVICE FOR ASSISTING BACK-REVEALING SLEEVE-FOLDING DEVICE, AND FOLDING DEVICE

CROSS-REFERENCE TO RELATED APPLICATION

This application is a 371 application of the international PCT application serial no. PCT/JP2018/020366, filed on May 28, 2018. The entirety of the above-mentioned patent application is hereby incorporated by reference herein and made a part of this specification.

TECHNICAL FIELD

The present invention relates to a sleeve-folding assistance device for assisting a sleeve-folding device which guides both sleeve portions of a garment to a back-revealing sleeve-folding device in order to fold both sleeve portions so that both sleeve portions of the garment overlap a chest of the garment when so-called back-revealing folding is performed on the garment.

BACKGROUND ART

In a so-called linen supply industry, the following service is repeated. That is, a garment used in a hotel and a hospital, for example, a gown or a bath-gown is collected, washed, dried, ironed, folded, and delivered to a customer of the hotel, hospital, or the like.

In this case, a shape of the garment when the garment is folded may be specified according to a request of the customer. In this case, there are roughly two types of folding methods, for example, so-called chest-revealing folding and back-revealing folding.

Of these, in the chest-revealing folding, the garment is folded so that a chest portion of the garment is exposed to an outside. This chest-revealing folding may be requested by a customer, especially when a mark or the like is attached to a chest portion of a garment or in order to make a tag on a back collar portion visible.

Here, in the chest-revealing folding, folding is performed through the following steps. That is, after both sleeve portions of the garment are folded so as to be in contact with a back portion of the garment, the garment is folded in a width direction, and thereafter, folded in a back vertical direction, and thus, the garment is folded.

In addition, the back-revealing folding means folding a back portion of the garment so that the back portion is folded to be exposed to the outside. This back-revealing folding may be requested by a customer, especially when a mark or the like is attached to a back portion of a garment, or in order to make an exposed tag visible around a neck.

Here, in the back-revealing folding, after both sleeve portions of a garment are folded so as to be in contact with a chest portion of the garment, the garment is folded in a vertical direction, and thereafter, folded in a width direction of the garment, and thus, the garment is folded.

Japanese Unexamined Patent Application Publication No. 2009-213553 discloses such a folding device. According to this, by loading a garment hung on a hanger in the folding device, the chest-revealing folding can be automatically performed. However, in order to perform the back-revealing folding by this device, when an operator loads a garment in this device, the operator should manually fold both sleeve portions of the garment on a conveyor of the device so that both sleeve portions are in contact with a chest portion. In this way, in the chest-revealing folding, the folding can be automatically performed, but in the back-revealing folding, the folding cannot be automatically performed, and work efficiency deteriorates. In particular, the operator folds the sleeve so that the sleeve overlaps the chest portion, and then places the garment on a conveyor in a laid-down state. Accordingly, when the operator arranges a front portion of a garment such as a gown or a bath-gown so that the front body portion is placed to be in contact with a conveyor, an appearance of the garment is disturbed and efficiency further deteriorates.

CITATION LIST

Patent Literature

[Patent Citation 1] Japanese Unexamined Patent Application Publication No. 2009-213553

SUMMARY

Technical Problem

The present invention is made in consideration of the above-described points, and an object thereof is to provide a sleeve-folding assistance device for guiding both sleeve portions of a garment to a back-revealing sleeve-folding device when both sleeve portions of the garment are folded to overlap a chest portion of the garment in order to perform back-revealing folding and assisting the back-revealing sleeve-folding device.

According to a first aspect, there is provided a sleeve-folding assistance device for assisting a back-revealing sleeve-folding device, the sleeve-folding assistance device including: a pair of right and left sleeve guide portions which disposes a body portion of a garment having the body portion and both sleeve portions on a loading conveyor to transport the garment from a front to a rear, and moves to approach both sides of the loading conveyor so as to guide both sleeve portions of the garment hung down on both sides of the loading conveyor to a sleeve-folding device for performing back-revealing sleeve-folding, in which when the pair of right and left sleeve guide portions approaches both sides of the loading conveyor and transports the body portion from the front to the rear on the loading conveyor, the pair of right and left sleeve guide portions lifts both sleeve portions of the garment, respectively.

In the sleeve-folding assistance device for assisting a back-revealing sleeve-folding device of a second aspect, in the first aspect, the pair of right and left sleeve guide portions has a pair of right and left base portions which is disposed at a predetermined gap on both sides of the loading conveyor, and a moving portion which is rotatably disposed on the base portions, and when the moving portion rotates and approaches the loading conveyor, both sleeve portions of the garment are lifted by the moving portion, and both sleeve portions are further placed on the base portion to guide both sleeve portions of the garment to the back-revealing sleeve-folding device.

In the sleeve-folding assistance device for assisting a back-revealing sleeve-folding device of a third aspect, in the second aspect, the base portion further has a flip-up portion for lifting both sleeve portions of the garment, and both sleeve portions placed on the base portions are further flipped up by the flip-up portion.

In a back-revealing sleeve-folding device according to a fourth aspect, both sleeve portions of a garment are lifted by the sleeve-folding assistance device for assisting the back-revealing sleeve-folding device according to any one of the first to third aspects, and thereafter, both sleeve portions are folded to overlap a chest portion of the garment.

A folding device according to a fifth aspect includes the back-revealing sleeve-folding device according to the fourth aspect.

Advantageous Effects

According to the present invention, when both sleeve portions of the garment are folded so as to overlap a chest of the garment in order to perform back-revealing folding, it is possible to provide the sleeve-folding assistance device for guiding the sleeve portions to the back-revealing sleeve-folding device and assisting the back-revealing sleeve-folding device.

DESCRIPTION OF THE EMBODIMENTS

Figure 1:
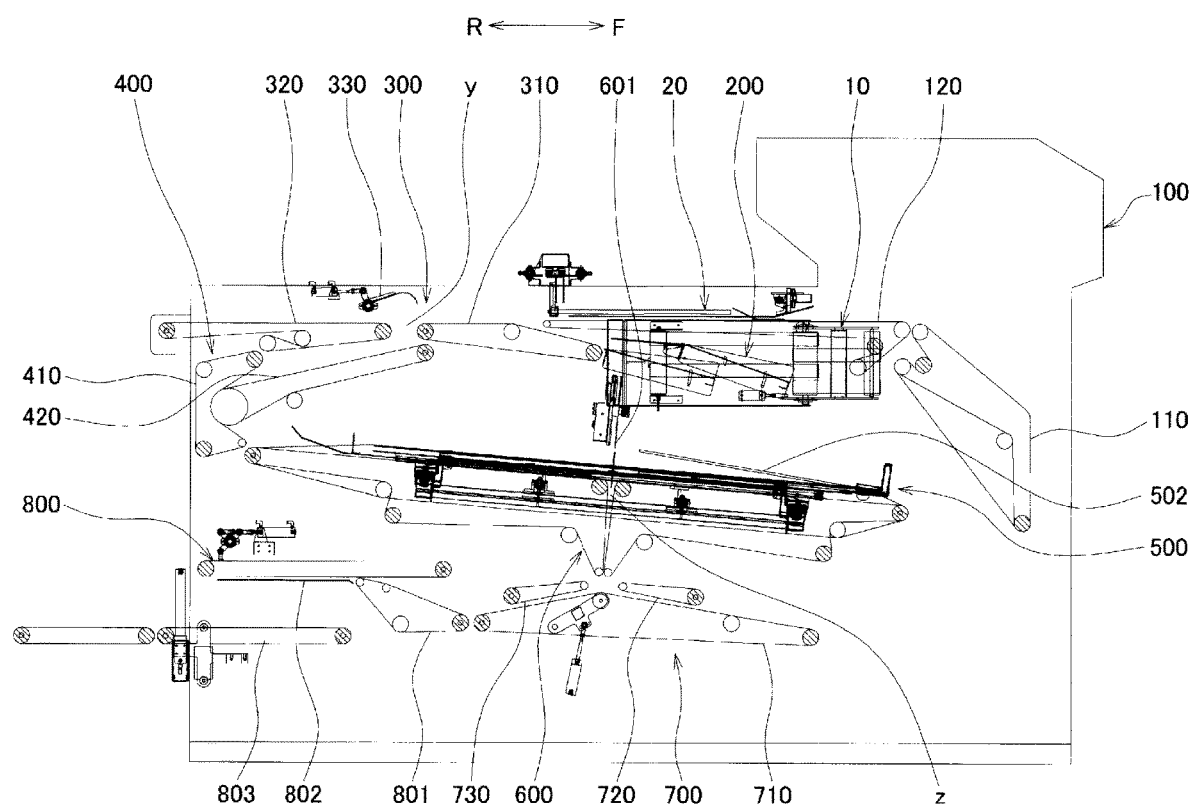
FIG. 1 is a side view of a garment folding device.
Figure 2:
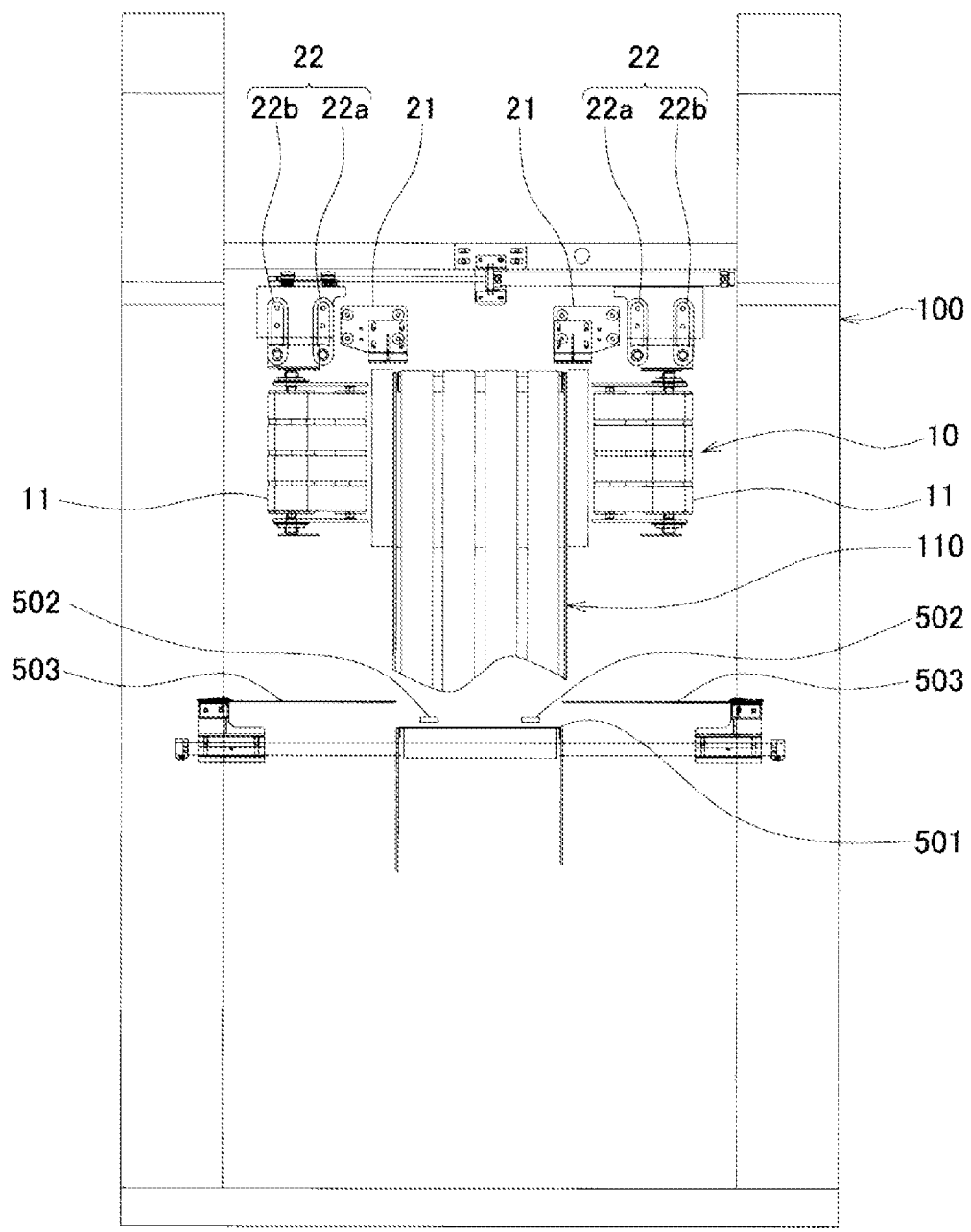
FIG. 2 is a front view of the garment folding device when viewed from a front F to a rear R of FIG. 1.

A back-revealing sleeve-folding assistance device 10 lifts hanging both sleeve portions C2 and C2 of a garment C and maintains the state. Further, the back-revealing sleeve-folding assistance device 10 has a pair of right and left sleeve guide portions 11 and 11, and each of the sleeve guide portions 11 has a base portion 12 and a moving portion 13. It is preferable that a loading conveyor 120 has a width sufficient for placing a body portion c1 of the garment C. Further, the pair of right and left sleeve guide portions 11 and 11 are disposed on both the right and left sides of the loading conveyor 120 (refer to FIGS. 1, 2, and 3).

The pair of right and left sleeve guide portions 11 and 11 are disposed substantially parallel to a transport direction (front F to rear R) of the loading conveyor 120 so as to have predetermined gaps x and x on both the right and left sides of the loading conveyor 120, respectively. Moreover, the gaps x and x will be described later. Further, as will be described later, the pair of right and left sleeve guide portions 11 and 11 guides both sleeve portions C2 and C2 of the garment C hung down to sleeve folding portions 22 and 22 for folding both sleeve portions C2 and C2 of the garment C in the back-revealing sleeve-folding device 20.

The base portions 12 and 12 are attached to the back-revealing sleeve-folding device 20, each of the base portions 12 and 12 has a shaft portion 12a at a distal end thereof, and the moving portion 13 is rotatably disposed with the shaft portion 12a. The moving portion 13 can rotate from a state in which the moving portion is disposed substantially parallel to the base portion 12 to a state in which the moving portion approaches the loading conveyor 120. However, the moving portions 13 and 13 may rotate so as to come into contact with the loading conveyor 120.

Figure 4:
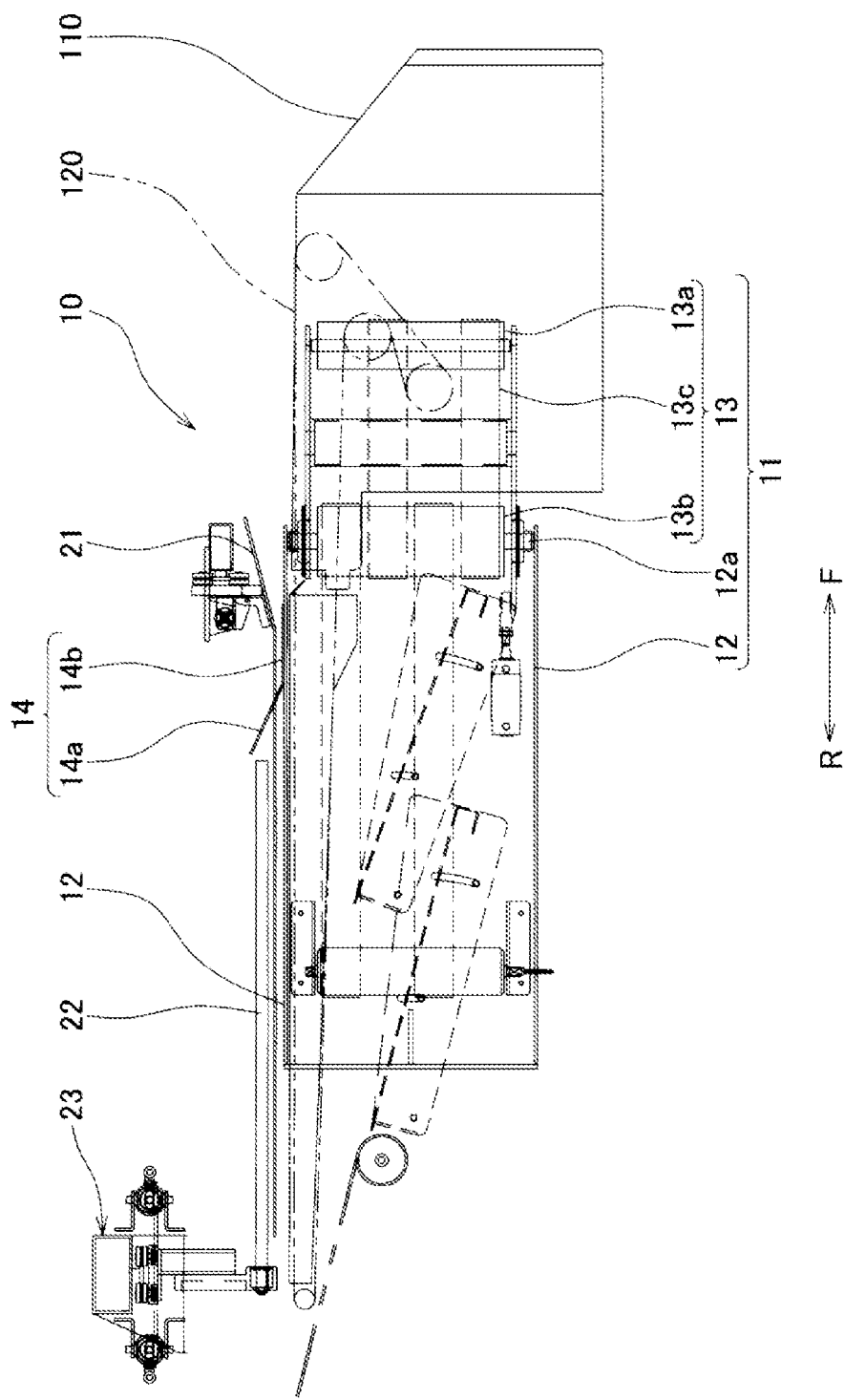
FIG. 4 is a partially enlarged side view of the sleeve-folding assistance device in the garment folding device.

An upper surface of each of the pair of right and left sleeve guide portions 11 and 11 is disposed at a position slightly higher than a position of the loading conveyor 120 in a side view (refer to FIG. 4). This is because, as will be described later, it is preferable to fold both sleeve portions C2 and C2 of the garment C by the back-revealing sleeve-folding device 20. Further, in order to lift the hanging both sleeve portions C2 and C2 upward, flip-up portions 14 and 14 are provided on the upper surfaces of the pair of right and left sleeve guide portions 11 and 11, respectively. Preferably, each of the flip-up portions 14 and 14 is obtained by bending a flat plate, each of the flip-up portions 14 and 14 has plate-shaped first plate portion 14a and second plate portion 14b, and it is preferable that the first plate portion 14a and the second plate portion 14b are connected to each other at an angle of about 120° to 140° in a side view. Moreover, the second plate portion 14b is attached to the upper surface of each of the pair of right and left sleeve guide portions 11 and 11.

Figure 3:
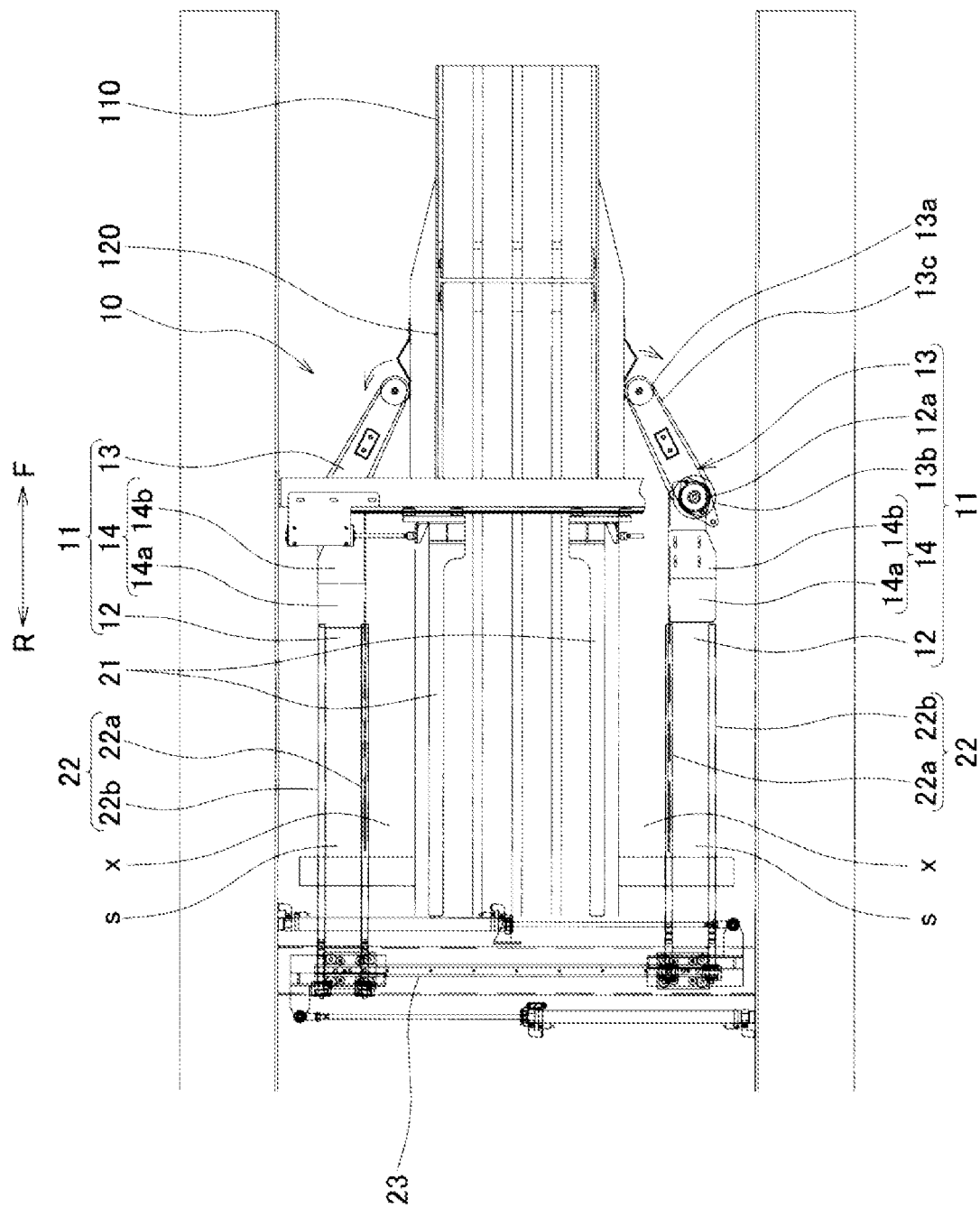
FIG. 3 is a plan view of a sleeve-folding assistance device in the garment folding device.

In addition, the moving portion 13 can also be configured by the conveyor belt 13c so as to orbit between a first support shaft 13a and a second support shaft 13b in a direction of an arrow in FIG. 3 in a plan view. Accordingly, when the body portion of the garment is transported to the loading conveyor 120 and both sleeve portions C2 and C2 of the garment C come into contact with the moving portions 13 and 13, both sleeve portions come into contact with outer portions of the moving portions 13 and 13, both sleeve portions C2 and C2 of the garment C are gradually lifted, and both sleeve portions C2 and C2 of the garment C are placed on the base portions 12.

That is, when the garment C is placed on a front end conveyor 110 and the garment C is transported to the loading conveyor 120, the garment C moves to the loading conveyor 120, and both sleeve portions C2 and C2 thereof are hung down on both sides of the loading conveyor 120. Further, when the loading conveyor 120 tries to transport the garment C from the front F to the rear R, an operator presses a switch (not illustrated) for selecting back-revealing folding in advance, and thus, the moving portions 13 and 13 are rotated from the state in which the moving portions are disposed substantially parallel to the base portions 12 and 12 to the state in which the moving portions are in contact with the loading conveyor 120.

As described above, the moving portions 13 and 13 rotate from the state where the moving portions are arranged substantially parallel to the base portions 12 and 12 to the state where the moving portions are in contact with the loading conveyor 120. The rotation of the base portions 12 and 12 brings the base portions 12 and 12 into contact with both sides of the loading conveyor 120, respectively. As the garment is transported from the front F to the rear R by the loading conveyor 120, both sleeve portions C2 and C2 of the garment C hung down on both sides of the loading conveyor 120 are lifted by the moving portions 13 and 13. After that, both sleeve portions C2 and C2 of the garment C are placed on the base portions 12 and 12. Moreover, at the same time, both sleeve portions C2 and C2 of the garment C are prevented from entering the gaps x and x, respectively. That is, the back-revealing sleeve-folding assistance device 10 can sort the folding of the garment C into folding both sleeve portions C2 and C2 of the garment C to be described later by the back-revealing sleeve-folding device 20 so that both sleeve portions are folded on a chest of the garment C and folding both sleeve portions C2 and C2 of the garment C by a chest-revealing sleeve-fold portion 200 so that both sleeve portions are folded on a back of the garment C to expose a chest portion of the garment C.

As described above, both sleeve portions C2 and C2 of the garment C hung down on both sides of the loading conveyor 120 are lifted by the moving portions 13 and 13 and then placed on the base portions 12 and 12. Then, both sleeve portions C2 and C2 of the garment C are guided to the sleeve folding portions 22 and 22 in the sleeve fold portion 20 described later which are disposed in advance near the base portions 12 and 12, and both sleeve portions C2 and C2 of the garment C are placed on the sleeve folding portions 22 and 22.

Next, the back-revealing sleeve-folding device 20 will be described. The sleeve fold portion 20 folds both sleeve portions C2 and C2 of the garment C so that both sleeve portions are folded over the chest of the garment C, and performs the folding to expose the back portion of the garment C. Further, the back-revealing sleeve-folding device 20 includes a pair of right and left sleeve-folding gauge portions 21 and 21 which define folding positions of both sleeve portions C2 and C2 of the garment C and sleeve folding portions 22 and 22 which folds both sleeve portions C2 and C2 of the garment C according to the positions indicated by the pair of right and left sleeve-folding gauge portions 21 and 21. The sleeve folding portions 22 and 22 may have only the inner sleeve folding rods 22a and 22a, respectively, and in this case, the sleeve folding portions can be disposed on the base portions 13 and 13 at a position close to the loading conveyor 120. Further, the sleeve folding portions 22 and 22 each have the inner sleeve folding rod 22a and the outer sleeve folding rod 22b which are in the shape of two rods, and preferably, the outer sleeve folding rod 22b is located inside the flip-up portion 14 in a plan view (refer to FIG. 3). Further, preferably, a width of a gap s between the inner sleeve folding rod 22a and the outer sleeve folding rod 22b is narrower than the flip-up portion 14 in a plan view.

The pair of right and left sleeve-folding gauge portions 21 and 21 can be moved in a width direction (right-left direction) of the loading conveyor 120, respectively, and a position of a width therebetween can be adjusted according to a size of the garment C. Further, the sleeve folding portions 22 and 22 further have a mobile portion 23 for reciprocating from both sides (right-left direction) of the loading conveyor 120 toward a center substantially horizontally. An air cylinder can be used for the mobile portion 23. Accordingly, both sleeve portions C2 and C2 of the garment C placed on the sleeve folding portions 22 and 22 can be folded by the sleeve folding portions 22 and 22 which reciprocate substantially horizontally from both sides (right-left direction) of the loading conveyor 120 toward the center so that both sleeve portions C2 and C2 of the garment C overlap the chest portion of the garment C.

Further, the sleeve folding portions 22 and 22 are disposed at positions close to the base portions 13 and 13. Therefore, both sleeve portions C2 and C2 of the garment C are lifted by the moving portions 13 and 13. After that, both sleeve portions C2 and C2 of the garment C are placed on the base portions 12 and 12, and both sleeve portions C2 and C2 of the garment C are disposed on the sleeve folding portions 22 and 22. In particular, when the flip-up portions 14 and 14 are provided, both sleeve portions C2 and C2 of the garment C can be easily placed on the sleeve folding portions 22 and 22. Therefore, both sleeve portions C2 and C2 of the garment C are favorably folded by the sleeve folding portions 22 and 22.

A garment folding device 100 is a device capable of performing both so-called chest-revealing folding and back-revealing folding on the garment C, and includes the above-mentioned loading conveyor 120, the above-mentioned back-revealing sleeve-folding assistance device 10, and the back-revealing sleeve-folding device 20. Further, the garment folding device 100 includes the chest-revealing sleeve-fold portion 200, a back-revealing folding portion 300, an inversion portion 400, a torso three-folding portion 500, a two-folding portion 600, and a chest-revealing two-folding portion 700, and a stacking portion 800 described later.

The chest-revealing sleeve-fold portion 200 will be described. The chest-revealing sleeve-fold portion 200 folds both sleeve portions C2 and C2 of the garment C so that both sleeve portions are folded over the back of the garment C, and performs the folding to expose the chest portion of the garment C. Further, the chest-revealing sleeve-fold portion 200 is disposed immediately below the loading conveyor 120, and has a left sleeve folding portion 210 and a right sleeve folding portion 220. Therefore, the back-revealing sleeve-folding device 20 is disposed above the loading conveyor 120, and the chest-revealing sleeve-fold portion 200 is disposed below the loading conveyor 120.

The left sleeve folding portion 220 described above is disposed slightly in front of the right sleeve folding portion 210. The right sleeve folding portion 210 has a first right roller 211, a second right roller 212, a third right roller 213, and a fourth right roller 214, and a right folding belt 215 is hung on the right rollers so as to orbit in a direction of an arrow in the drawing and is driven by a drive unit (not illustrated). Of the first right roller 211, the second right roller 212, the third right roller 213, and the fourth right roller 214, the third right roller 213 and the fourth right roller 214 are disposed at positions close to each other. The third right roller 213 and the fourth right roller 214, the first right roller 211, and the second right roller 212, which are close to each other in this way, are disposed so as to have a substantially triangular shape in a plan view.

Further, in a plan view, the first right roller 211 is disposed in the gap x existing between the loading conveyor 120 and the pair of right and left sleeve guide portions 11. Further, the third right roller 213 and the fourth right roller 214 disposed at positions close to each other are disposed behind the first right roller 211. Further, the second right roller 212 is disposed immediately below a left end portion 1 of the loading conveyor 120.

Figure 5:
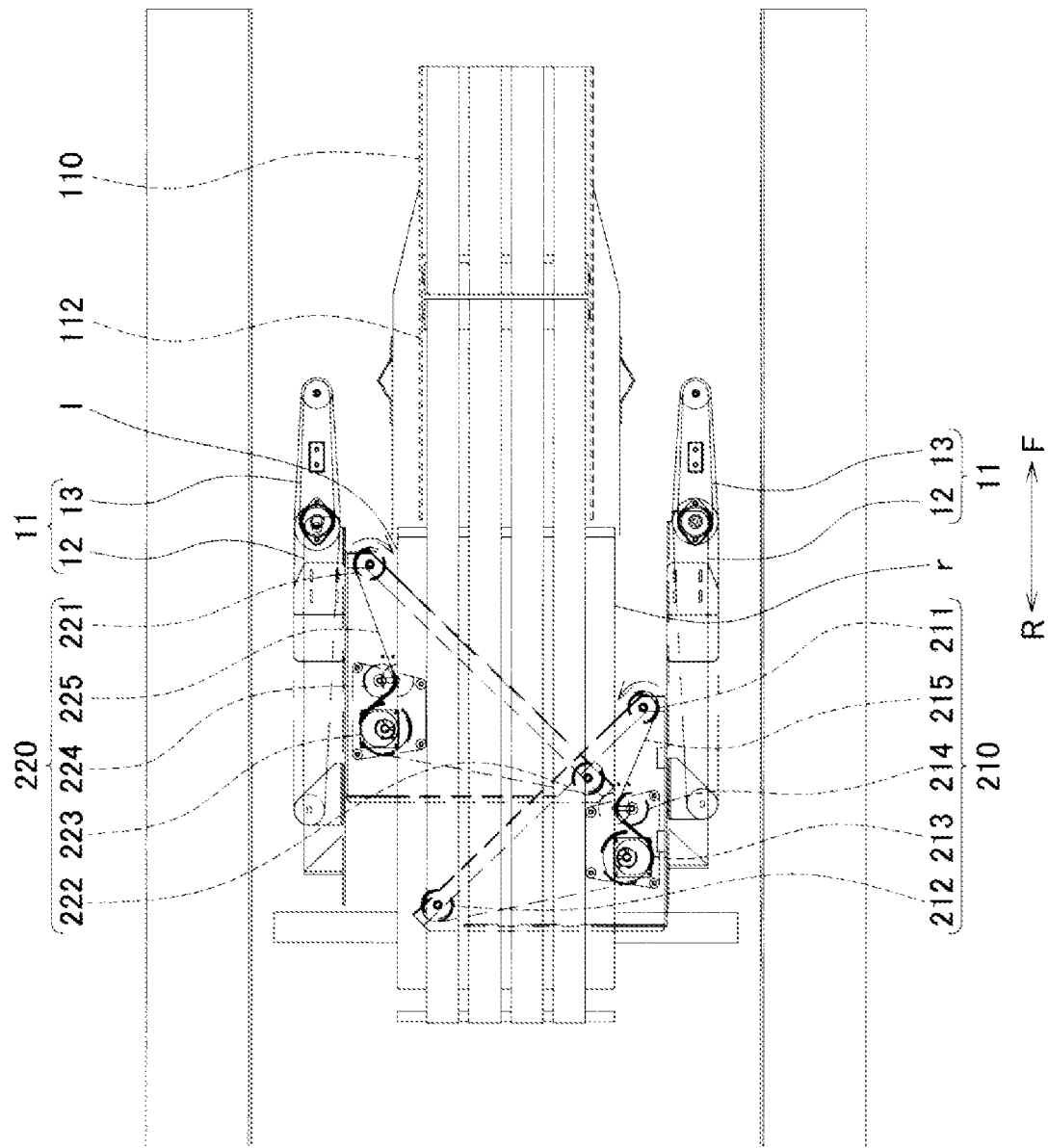
FIG. 5 is an enlarged plan view of a chest-revealing sleeve-fold portion in the garment folding device.
Figure 6:
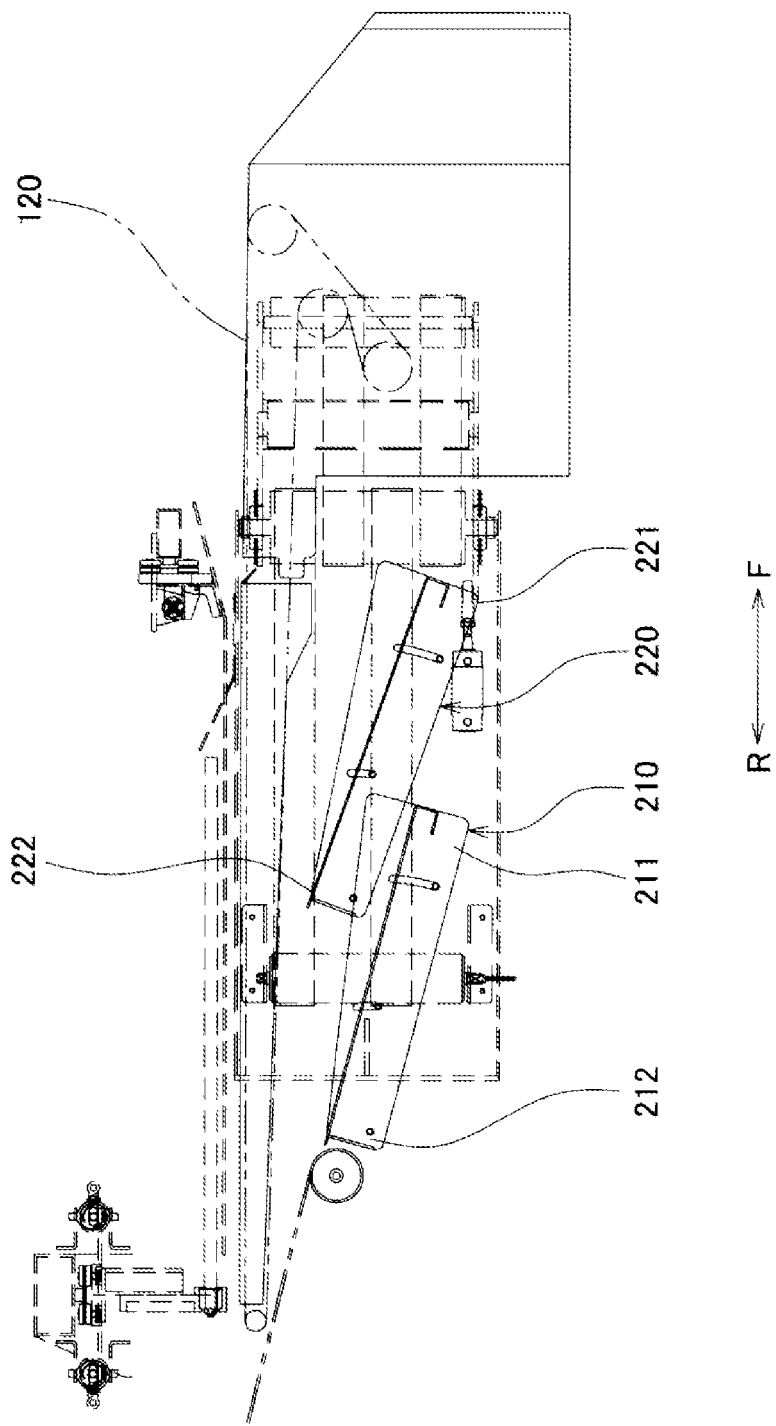
FIG. 6 is an enlarged side view of the chest-revealing sleeve-fold portion in the garment folding device.

Further, in a side view, the first right roller 211 is disposed obliquely upward so as to face the second right roller 212 (refer to FIG. 6). Further, the third right roller 213 and the fourth right roller 214 are disposed immediately below a right end portion r of the loading conveyor 120 (refer to FIG. 5).

Further, the left sleeve folding portion 220 has a first left roller 221, a second left roller 222, a third left roller 223, and a fourth left roller 224, and a left folding belt 225 is hung on the left rollers so as to orbit in a direction of an arrow in the drawing. Of the first left roller 221, the second left roller 222, the third left roller 223, and the fourth left roller 244, the third left roller 223 and the fourth left roller 224 are disposed at positions close to each other. The third left roller 223 and the fourth left roller 224, the first left roller 221, and the second left roller 222, which are close to each other in this way, are disposed so as to have a substantially triangular shape in a plan view.

Further, in a plan view, the first left roller 221 is disposed in the gap x existing between the loading conveyor 120 and the pair of right and left sleeve guide portions 11. Further, the third left roller 223 and the fourth left roller 224 disposed at the positions close to each other are disposed behind the first right roller 221. Further, the second left roller 222 is disposed immediately below the right end portion r of the loading conveyor 120.

Further, in a side view, the first left roller 221 is disposed obliquely upward so as to face the second left roller 222 (refer to FIG. 6). Further, the third left roller 223 and the fourth left roller 224 are disposed immediately below the left end portion 1 of the loading conveyor 120 (refer to FIG. 5).

The back-revealing folding portion 300 includes a first conveyor 310 which transports the garment to the rear R, a second conveyor 320 which transports the garment to the rear R and of which a rotation is reversed, and a folding knife portion 330. A first belt 314 is hung on the first conveyor 310 so as to orbit between the first roller 311, the second roller 312, and the third roller 313. The first roller 311, the second roller 312, and the third roller 313 are rotated together by a drive unit (not illustrated) so as to transport the garment to the rear R by the first belt 314.

Figure 7:
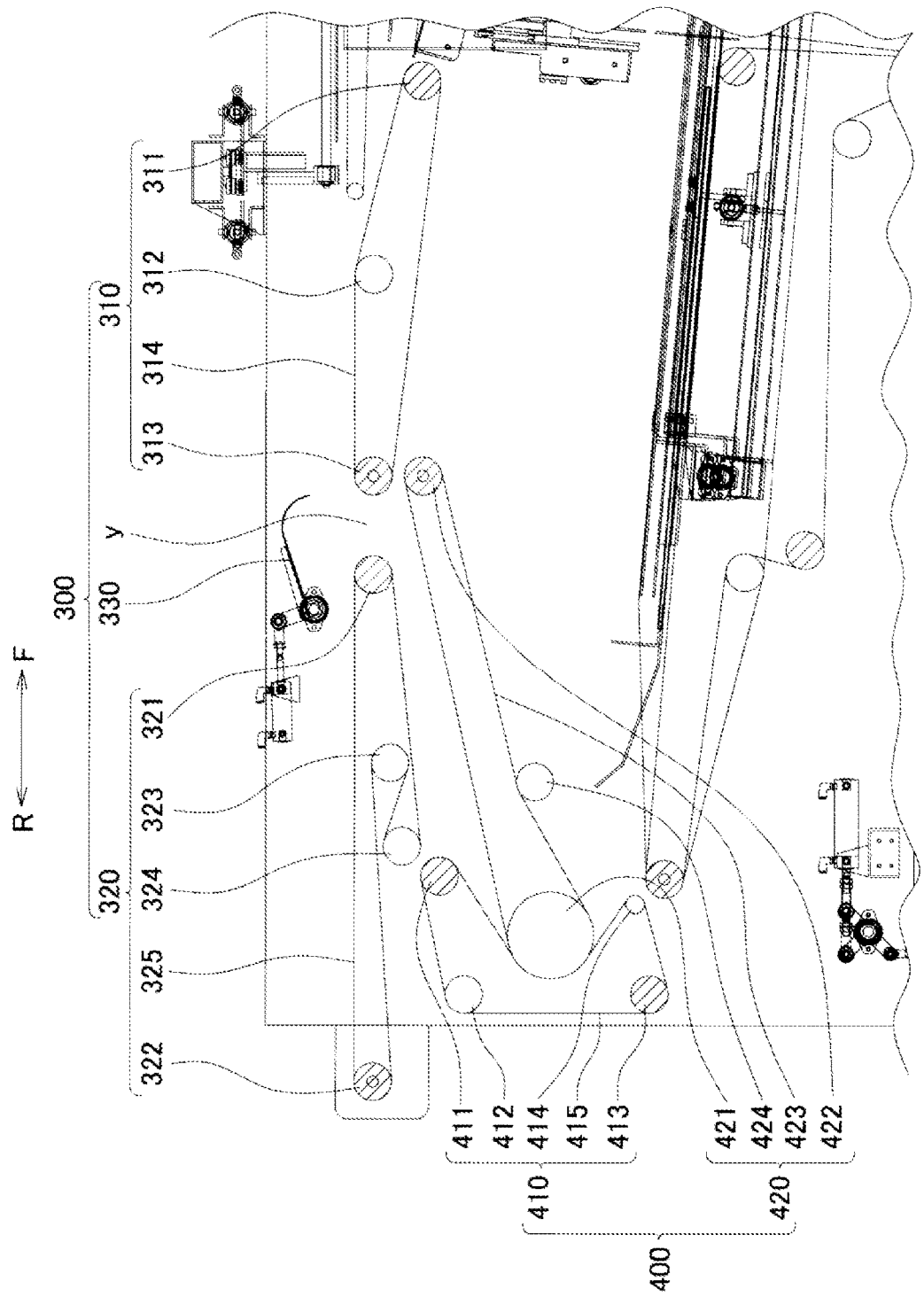
FIG. 7 is an enlarged side view of a back-revealing folding portion in the garment folding device.

The second conveyor 320 has a fourth roller 321, a fifth roller 322, a sixth roller 323, and a seventh roller 324, and a second belt 325 is hung so as to orbit between the respective rollers. The fourth roller 321 moves forward when the garment C is folded in two, and narrows a gap y between the first conveyor 310 and the second conveyor 320. After that, the garment C disposed so as to straddle the gap y is folded in two by pushing the garment C into the gap y by the folding knife portion 330. As a result, the garment C is folded so as to shorten a length thereof (refer to FIG. 7).

The inversion portion 400 literally flips the garment C up and down, and when a front body portion of the garment C is a front side, the inversion portion turns the front side over. The inversion portion 400 has a first inversion portion 410 and a second inversion receiving portion 420, and the first inversion portion 410 includes a first inversion roller 411, a second inversion roller 412, a third inversion roller 413, and a fourth inversion roller 414, and a first inversion belt 415 is hung so as to orbit between the respective rollers.

The second inversion receiving portion 420 is a conveyor belt for transporting the garment C to the rear, has a first inversion receiving roller 421 and a second inversion receiving roller 422, and an inversion receiving belt 423 is hung to orbit between the respective rollers. Further, the second inversion receiving portion 420 has a third inversion receiving roller 424 and prevents the inversion receiving belt 423 from being hung down.

Further, the second inversion roller 412 is disposed on the rear R of the first inversion roller 411, the third inversion roller 413 is disposed immediately below the second inversion roller 412, and the fourth inversion roller 414 is arranged on the front F of the third inversion roller 413, and the first inversion roller 411 is arranged above the fourth inversion roller 414. The first inversion belt 415 is pushed to rear R by the first inversion receiving roller 421 in which the inversion receiving belt 423 is disposed, and the first inversion belt 415 between the first inversion roller 411 and the fourth inversion roller 414 is bent and disposed so as to wrap around by the first inversion receiving roller 421. Therefore, the garment C can be inverted by the inversion receiving belt 423 hung around the first inversion receiving roller 421 and the first inversion belt 415 between the third inversion roller 413 and the fourth inversion roller 414.

Next, the torso three-folding portion 500 will be described. The torso three-folding portion 500 has a pair of torso three-folding gauges 502 and 502 which is disposed on a torso three-folding conveyor 501, and torso three-folding knives 503 and 503 which are disposed on right and left sides thereof, respectively. The torso three-folding conveyor 501 has a front conveyor 511 and a rear conveyor 512, and has a gap z between the front conveyor 511 and the rear conveyor 512.

Figure 8:
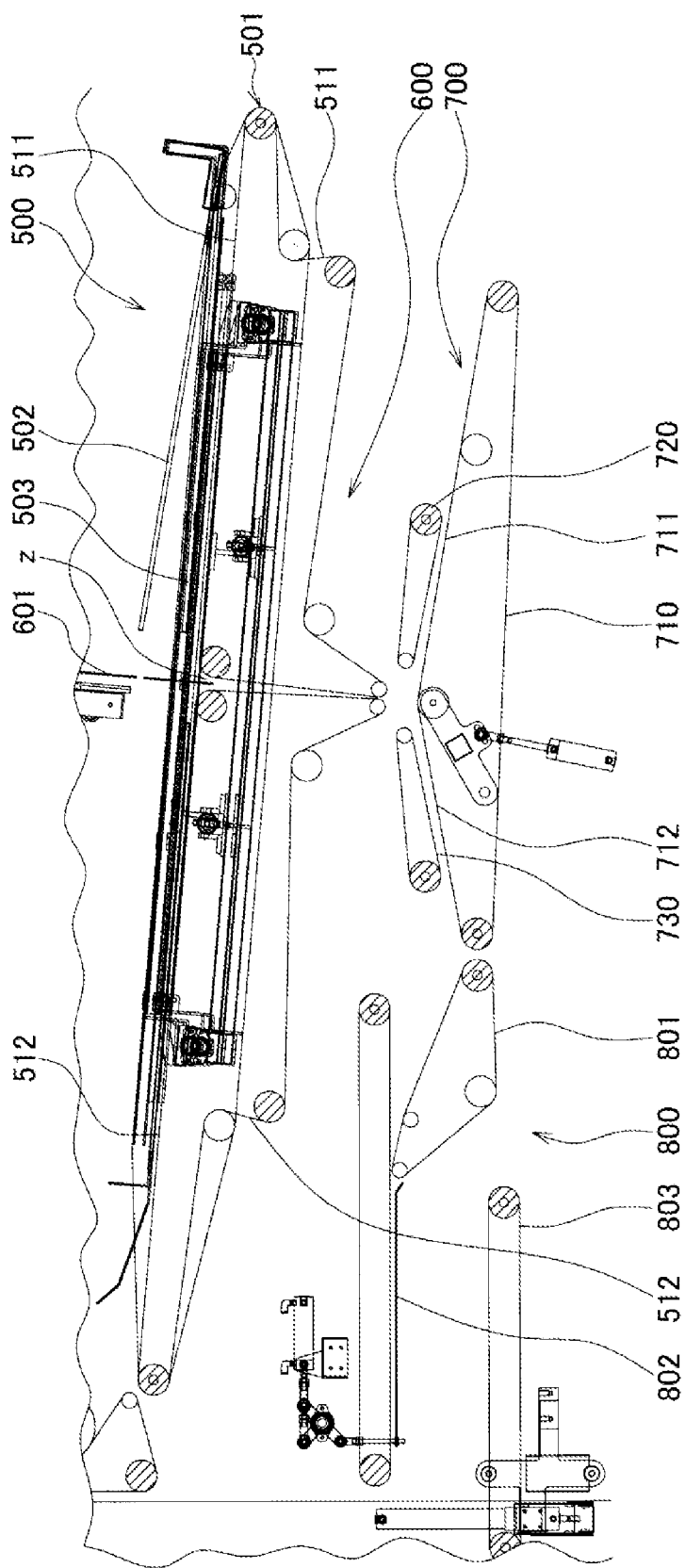
FIG. 8 is an enlarged side view illustrating a torso three-folding portion, a two-folding portion, and a chest-revealing two-folding portion in the garment folding device.

A gap between the pair of torso three-folding gauges 502 and 502 can be adjusted to a width of three-folding the body portion C1 of the garment C. Further, the garment C dropped between the pair of torso three-folding gauges 502 and 502 is used as a guide so that the pair of torso three-folding gauges 502 and 502 serve as a fold line of the garment C, and a torso of the garment C (width of garment C) can be folded in three by moving the torso three-folding knives 503 and 503 on the torso three-folding conveyor 501 in the right-left direction toward a center of the torso three-folding conveyor 501, respectively. (refer to FIGS. 2 and 8).

Next, the two-folding portion 600 will be described. The two-folding portion 600 folds the garment C in two in a length direction (the length of the garment C), and the two-folding portion 600 has a two-folding knife 601 and is disposed immediately above the gap z between the front conveyor 511 and the rear conveyor 512 described above. The garment C is disposed so as to straddle the gap z between the front conveyor 511 and the rear conveyor 512, and the two-folding knife 601 disposed immediately above the gap z is pushed down to push the garment C into the gap z. Accordingly, the garment C in a state of being folded in two is pushed into the gap z, and the garment C can be further folded in two. Therefore, the length of the garment C is shortened (refer to FIG. 8).

Next, the chest-revealing two-folding portion 700 will be described. In the above-mentioned two-folding portion 600, the garment C folded in two in the length direction of the garment C is further folded in two in the length direction. The chest-revealing two-folding portion 700 has a first chest-revealing two-folding conveyor 710, a second chest-revealing two-folding conveyor 720, a third chest-revealing two-folding conveyor 730, and an ejection unit (not illustrated) for ejecting air. The first chest-revealing two-folding conveyor 710 has a substantially triangular shape in a side view, the second chest-revealing two-folding conveyor 720 is disposed above a front hypotenuse 711 disposed in a front portion of the first chest-revealing two-folding conveyor 710, the first chest-revealing two-folding conveyor 710 has a substantially triangular shape in a side view, and a third chest-revealing two-folding conveyor 730 is disposed above a rear hypotenuse 712 disposed in a rear portion of the first chest-revealing two-folding conveyor 710 (refer to FIG. 8).

The chest-revealing two-folding portion 700 having the above configuration further folds the garment C, which is discharged from the gap z between the front conveyor 511 and the rear conveyor 512 and folded in two, in two in the length direction of the garment C (length of the garment C).

Next, the stacking portion 800 will be described. The stacking portion 800 has a first stacking conveyor 801, a drop plate portion 802, and a second stacking conveyor 803, and stacks a plurality of folded garments C on the second stacking conveyor 803.

Figure 9:
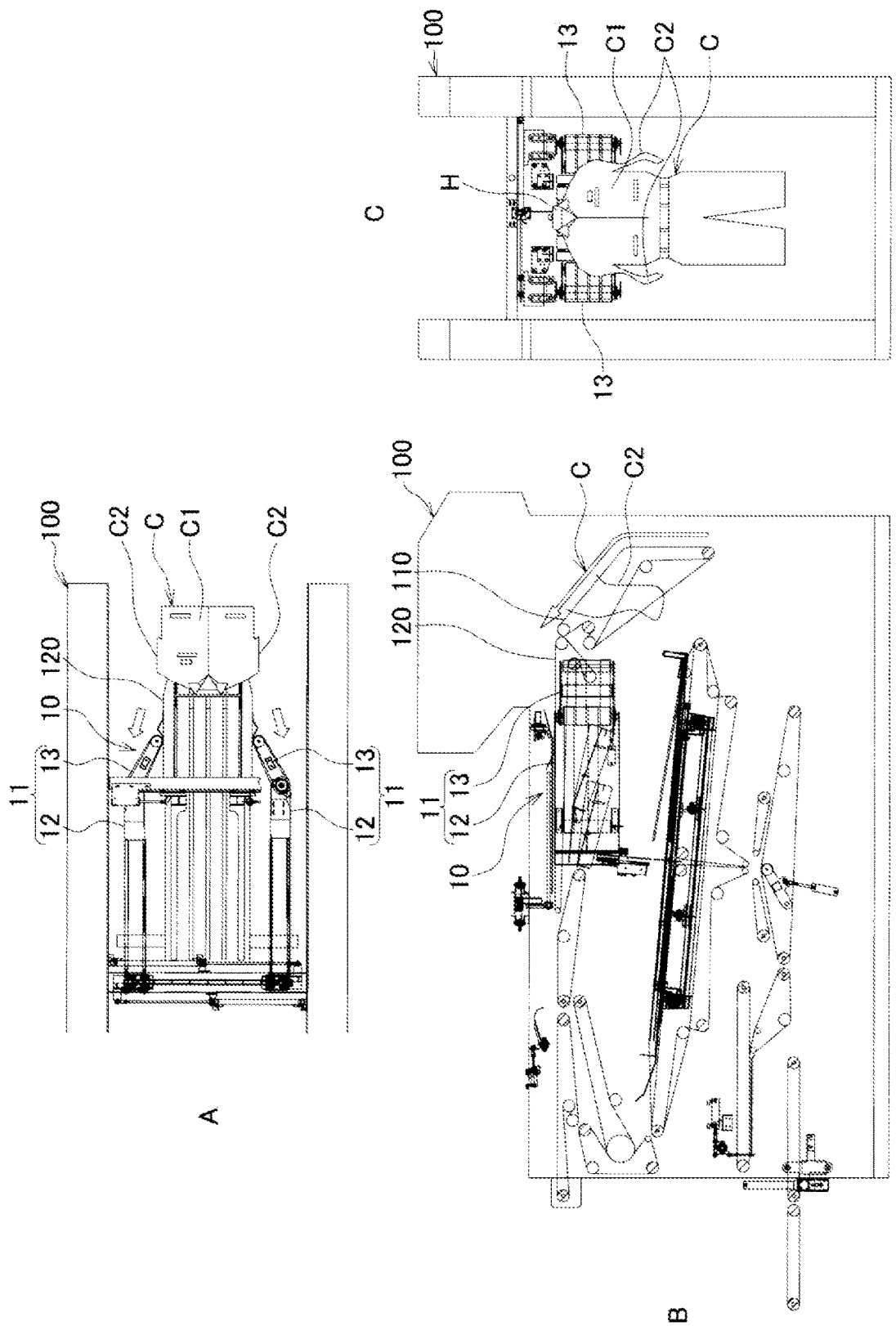
In FIG. 9, A is a plan view of the garment folding device for explaining a step of performing back-revealing folding, B is a side view of A, and C is a front view of A.

A step of performing the so-called back-revealing folding by the folding device 100 having the above configuration will be described. The so-called back-revealing folding step is achieved by sequentially performing the following steps. First, a sleeve lifting step will be described. In the sleeve lifting step, the garment C suspended from a hanger H is disposed on the front end conveyor 110 (refer to FIG. 9). At that time, since the operator (not illustrated) has selected the back-revealing folding step in advance, the moving portions 13 and 13 rotate so as to come into contact with the loading conveyor 120 (refer to A of FIG. 9).

Figure 10:
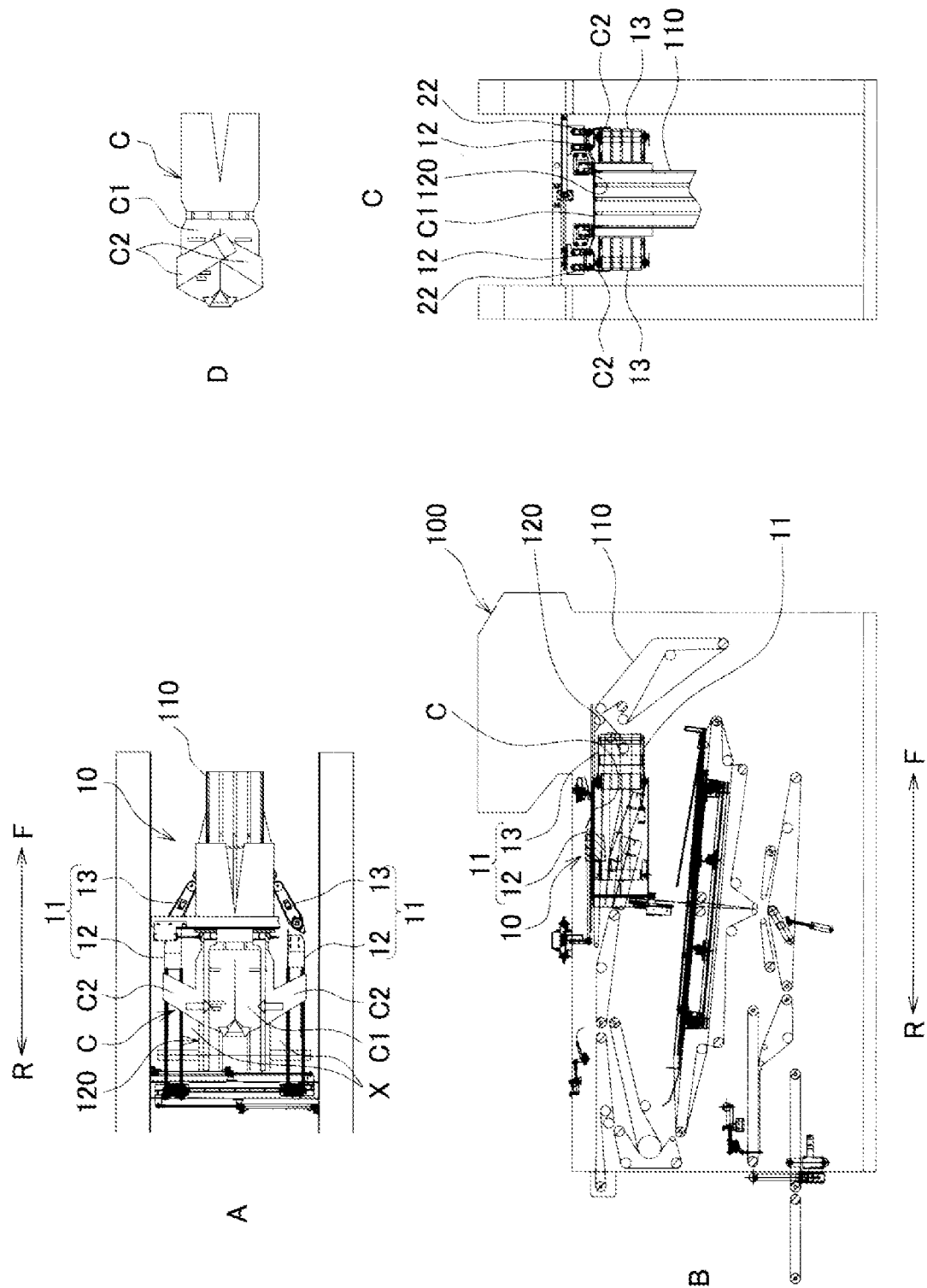
In FIG. 10, A is a plan view of the garment folding device for explaining a step of performing back-revealing folding, B is a side view of A, C is a front view of A, and D is a plan view of the garment which is back-revealing folded.

Further, as the garment C is transported from the front F to the rear R by the transport of the loading conveyor 120, the moving portions 13 and 13 which rotate so as to come into contact with the loading conveyor 120 lifts both sleeve portions C2 and C2 of the garment C. Both sleeve portions C2 and C2 of the lifted garment C move onto the base portions 12 and 12 (refer to A, B, and C of FIG. 10).

Both sleeve portions C2 and C2 of the garment C which have moved onto the base portions 12 and 12 are moved onto the base portions 12 and 12 and at the same time are disposed on the sleeve folding portions 22 and 22 in the back-revealing sleeve-folding device 20, respectively. Therefore, the sleeve folding portions 22 and 22 move horizontally toward the center in the width direction of the loading conveyor 120, respectively, and thus, both sleeve portions C2 and C2 of the garment C can be folded so as to overlap the chest of the garment C according to the positions indicated by the pair of right and left sleeve-folding gauge portions 21 and 21 (refer to D of FIG. 10). This is called the so-called back-revealing.

Figure 11:
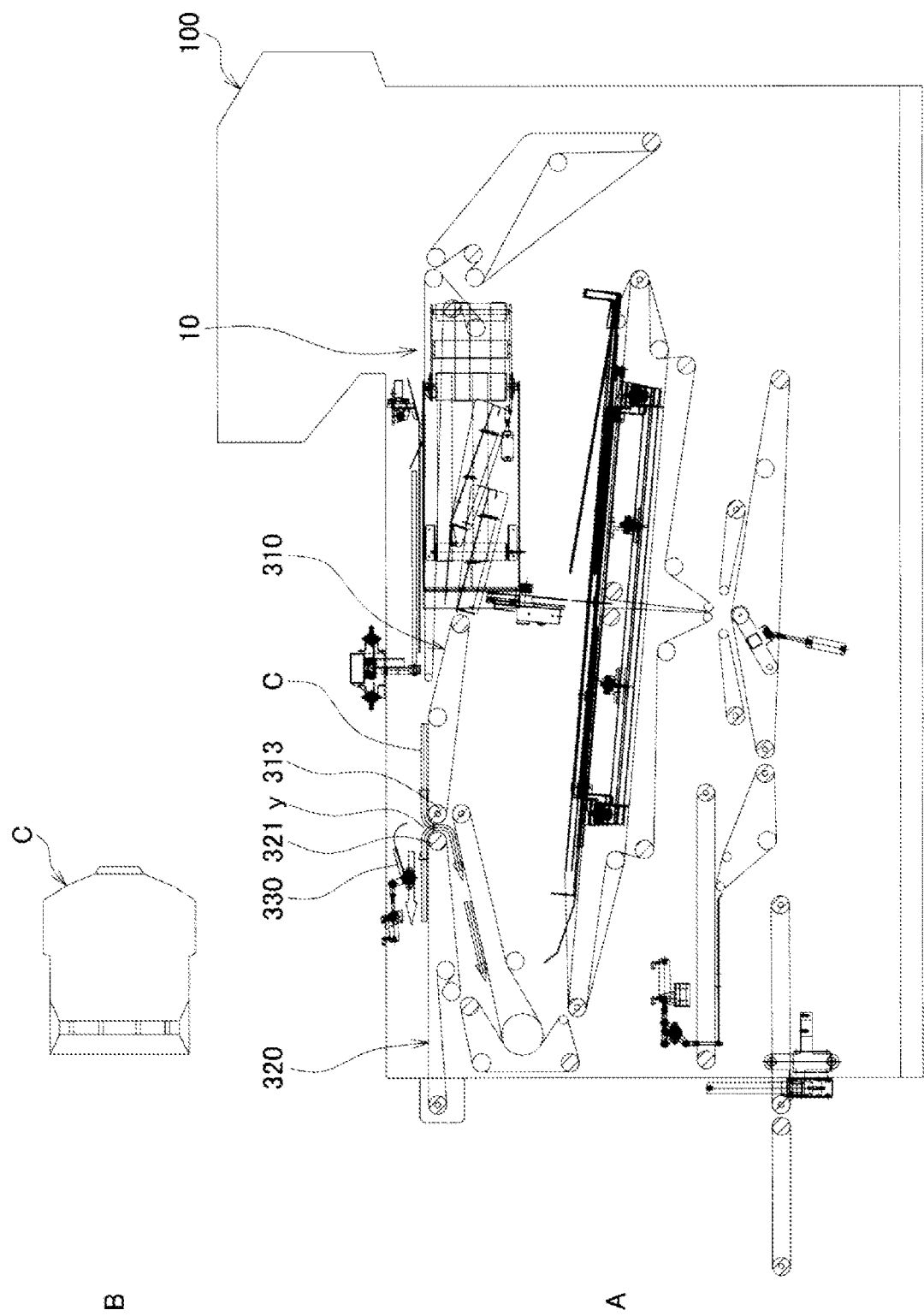
In FIG. 11, A is a side view of the garment folding device for explaining a back-revealing folding step of performing the back-revealing folding, and B is a plan view of the garment which is back-revealing folded.

Next, a back-revealing folding step of performing the back-revealing folding by the back-revealing folding portion 300 will be described. The garment C is further transported from the front F to the rear R. The fourth roller 321 of the second conveyor 320 approaches the third roller 313 of the first conveyor 310 in advance, and thus, the gap y decreases. Therefore, when the garment C is transported so as to straddle the gap y, and substantially half of the length of the garment C in the length direction is disposed on the gap y, the folding knife portion 330 is lowered toward the gap y, and thus, the garment C is folded so that the length in the length direction is substantially halved (refer to A and B of FIG. 11).

Figure 12:
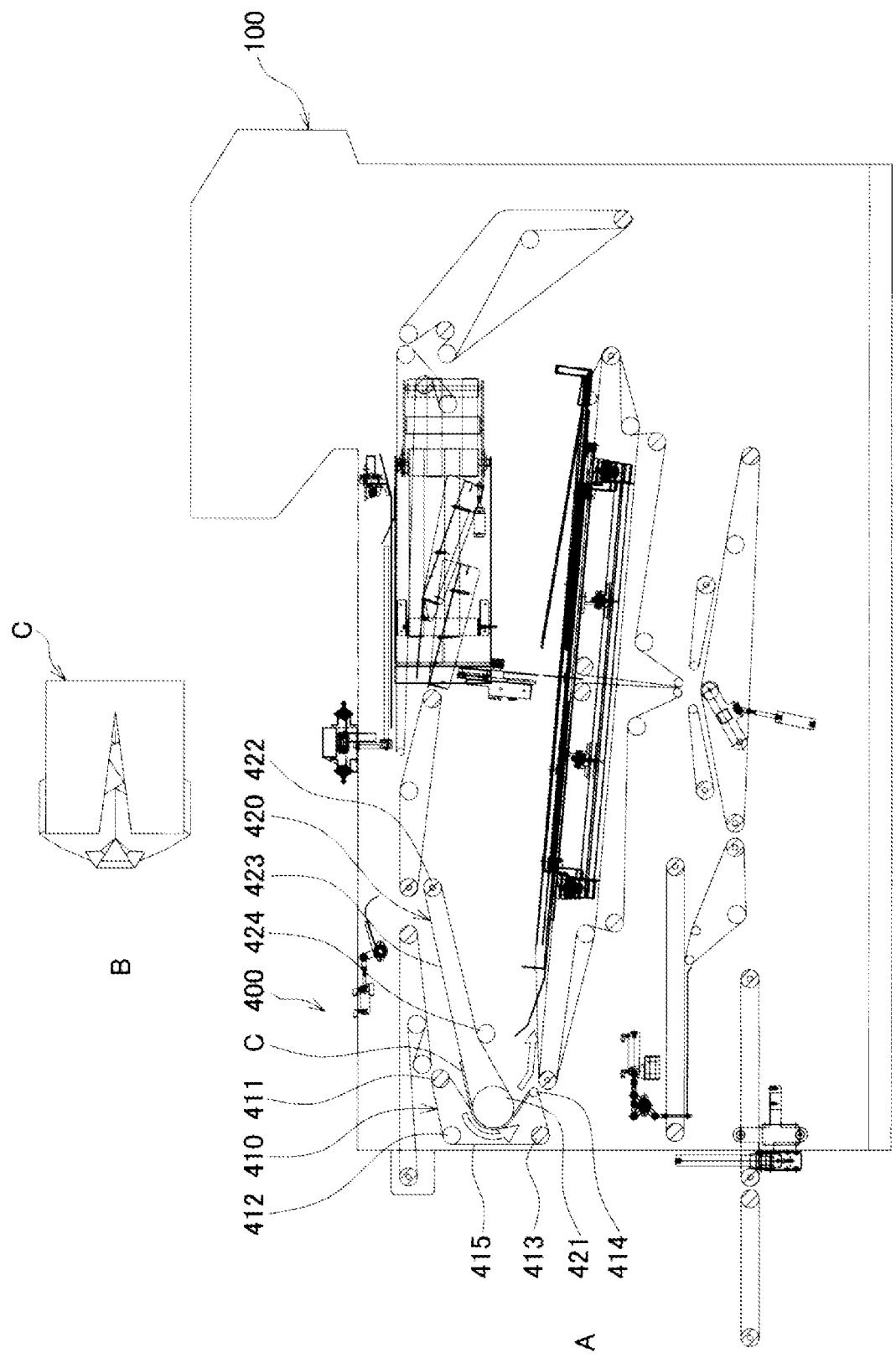
In FIG. 12, A is a side view of the garment folding device for explaining a garment inversion step, and B is an inverted plan view of the garment which is back-revealing folded.

Next, a garment inversion step will be described. As described above, in the back-revealing folding step, the back-revealing folding is performed and the garment C is inverted. As described above, the first inversion belt 415 between the first inversion roller 411 and the fourth inversion roller 414 is pushed to the rear R by the first inversion receiving roller 421, and is bent and disposed to wrap around the first inversion receiving roller 421. Therefore, the garment C interposed between the first inversion belt 415 and the inversion receiving belt 423 can be turned inside out (refer to A and B of FIG. 12).

Figure 13:
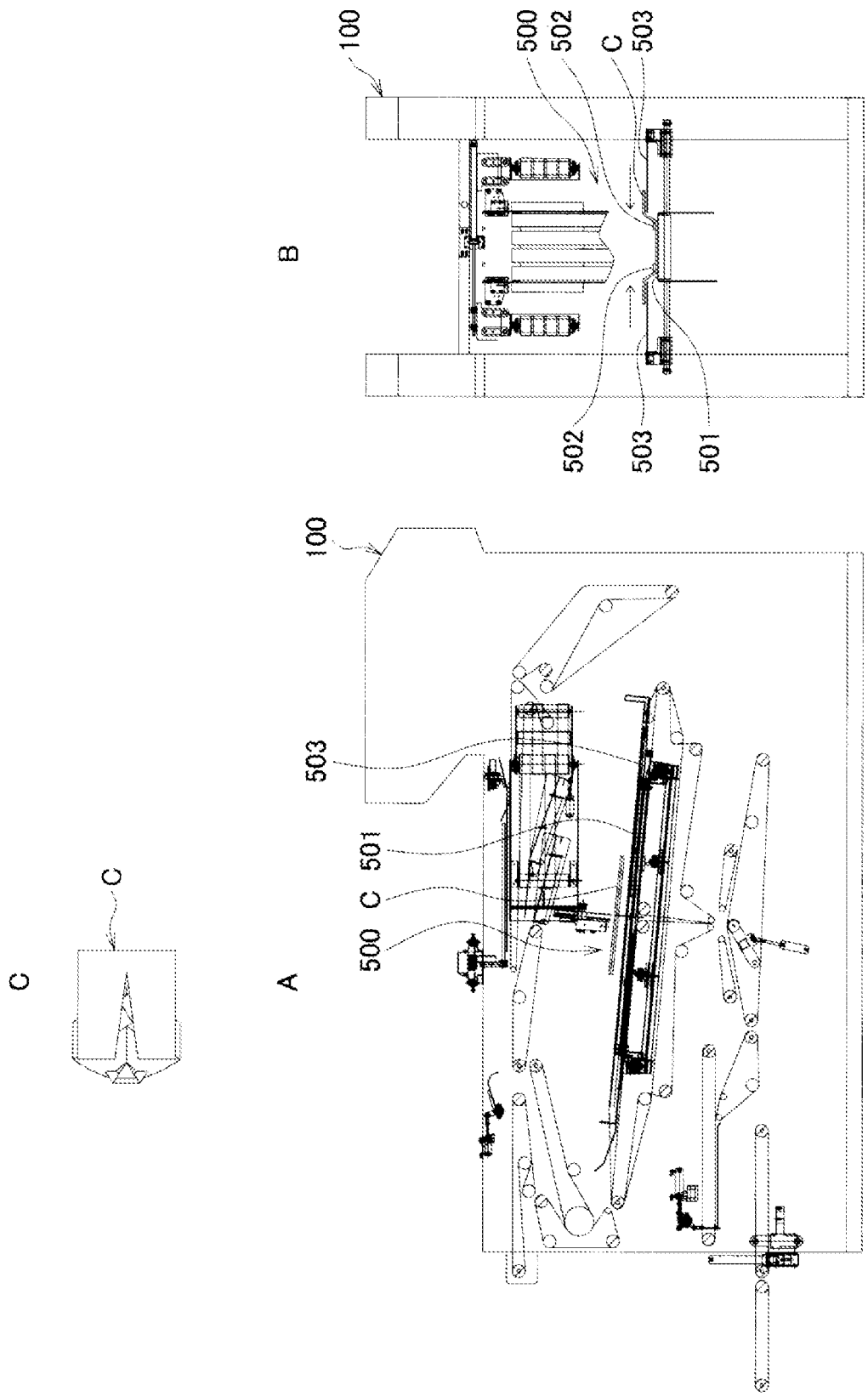
In FIG. 13, A is a side view of the garment folding device for explaining a torso three-folding step, B is a front view of A, and C is a plan view of the garment which is torso-folded in three.
Figure 14:
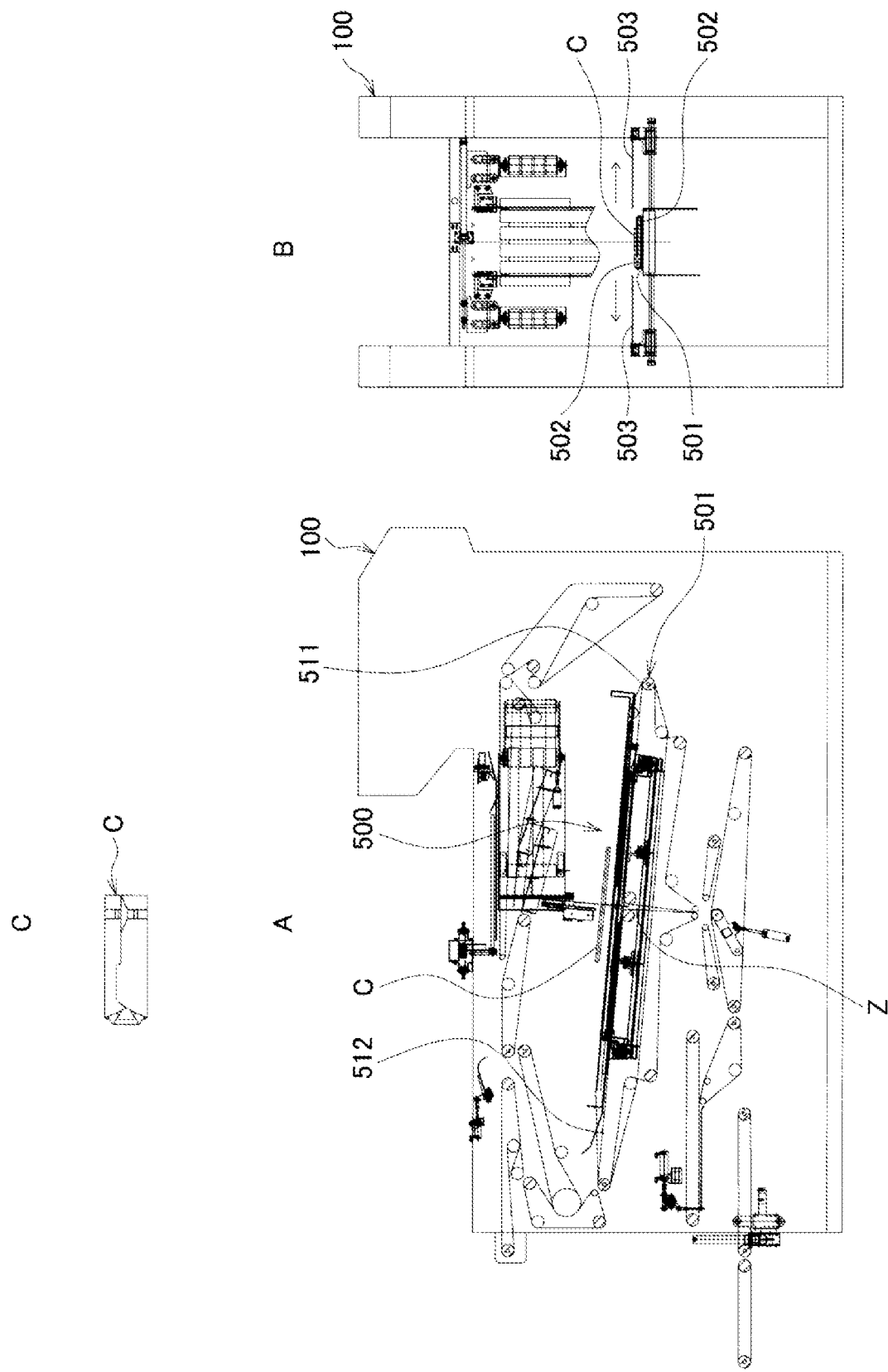
In FIG. 14, A is a side view of the garment folding device for explaining a state in which the garment is torso-folded in three by the torso three-folding step, B is a front view of A, and C is a plan view of the garment which is torso-folded in three.

Next, a torso three-folding step will be described. The torso three-folding step is a folding step in which the width of the torso of the garment C is narrowed by folding the garment C at two locations parallel to the length of the garment C. As described above, in order to fold the width of the inverted garment C (refer to C of FIG. 13) in three, the garment is disposed between the pair of torso three-folding gauges 502 and 502 on the torso three-folding conveyor 501 (refer to A, B, and C of FIG. 13). Thereafter, the torso three-folding knives 503 and 503 disposed on the right and left are operated toward the center of the conveyor 501, respectively, to fold the garment C in three (refer to A, B, and C of FIG. 14).

Figure 15:
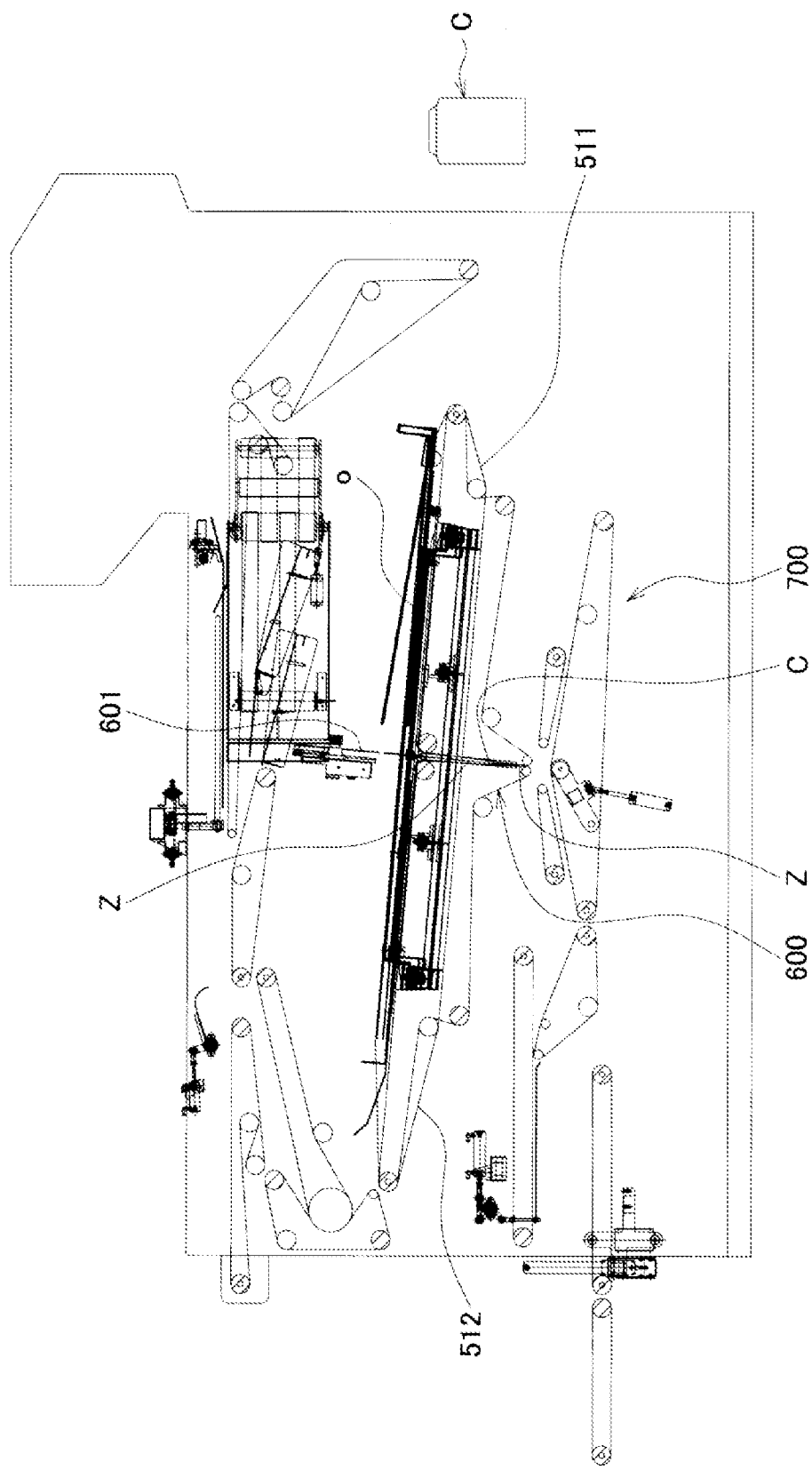
FIG. 15 is a side view of the garment folding device for explaining a two-folding step.

Next, a two-folding step will be described. The two-folding step is a step of substantially halving the length of the transported garment C in the length direction. As described above, the garment C of which the torso is folded in three is folded in two so as to further shorten the length. That is, when the garment C is transported so as to straddle the gap z between the front conveyor 511 and the rear conveyor 512, and a substantially central portion of the length of the garment C in the length direction is located on the gap z, by pushing down the two-folding knife 601 disposed immediately above the gap z and pushing the garment C into the gap z, the garment C folded in two is pushed into the gap z, and the torso of the garment C is folded in two (refer to FIG. 15). After that, the garment C passes between the first chest-revealing two-folding conveyor 710 and the third chest-revealing two-folding conveyor 730.

Figure 16:
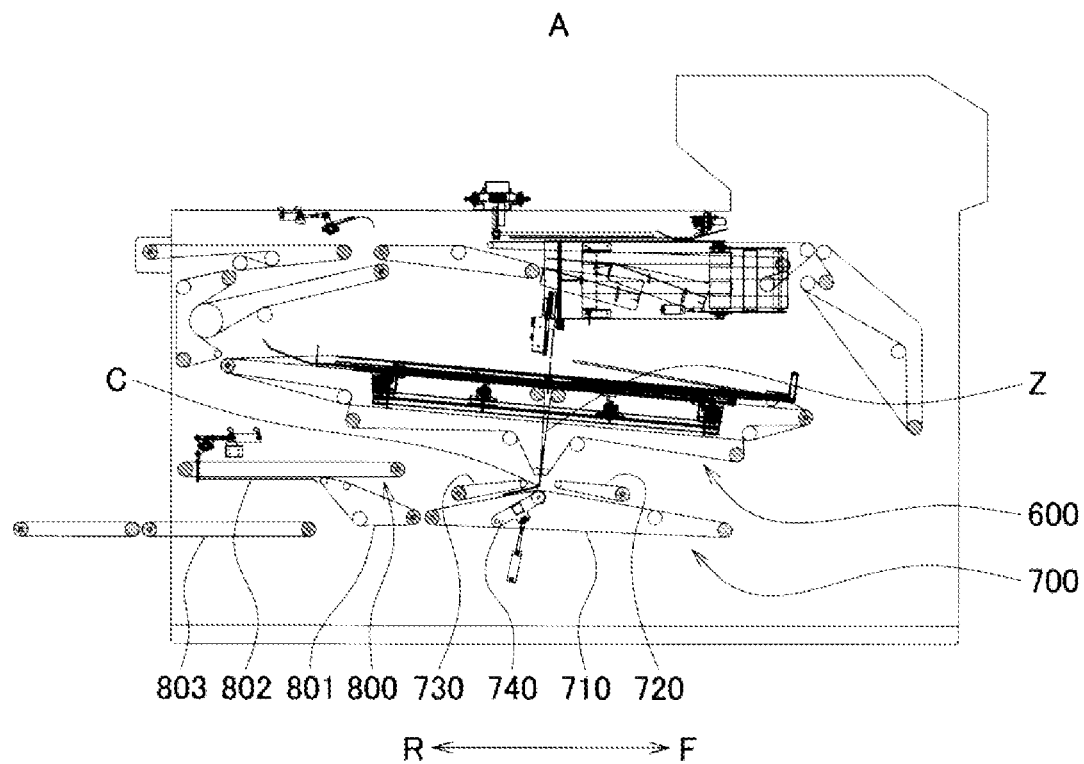
In FIG. 16, A is a side view of the garment folding device for explaining a stacking step, and B is a side view of a state in which a garment C is placed on a second stacking conveyor in the stacking step.
Figure 16:
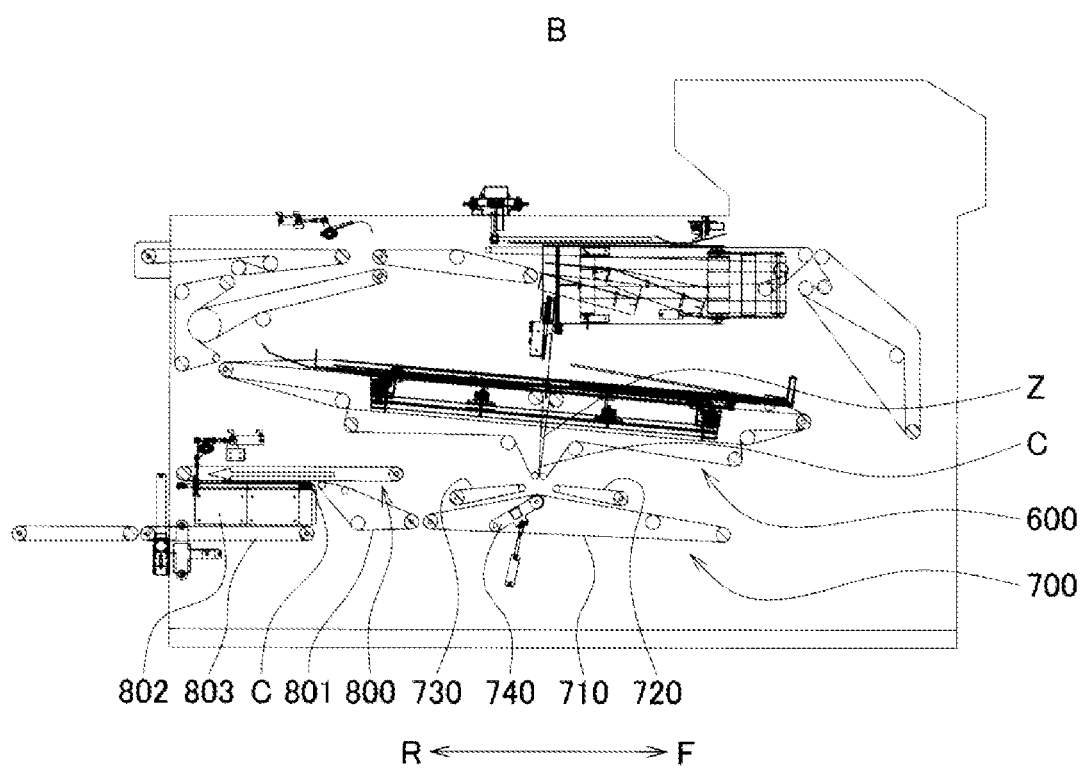

A stacking step will be described. The garment C folded in two passes through the chest-revealing two-folding portion 700 and is transported to the stacking portion 800. The garment C is further transported to the rear R by a stack first stacking conveyor 801 and is disposed on the closed drop plate portion 802 (refer to FIG. 16A). After that, the drop plate portion 802 is opened, and the folded garments C are stacked on the second stacking conveyor 803 (refer to B of FIG. 16).

Figure 17:
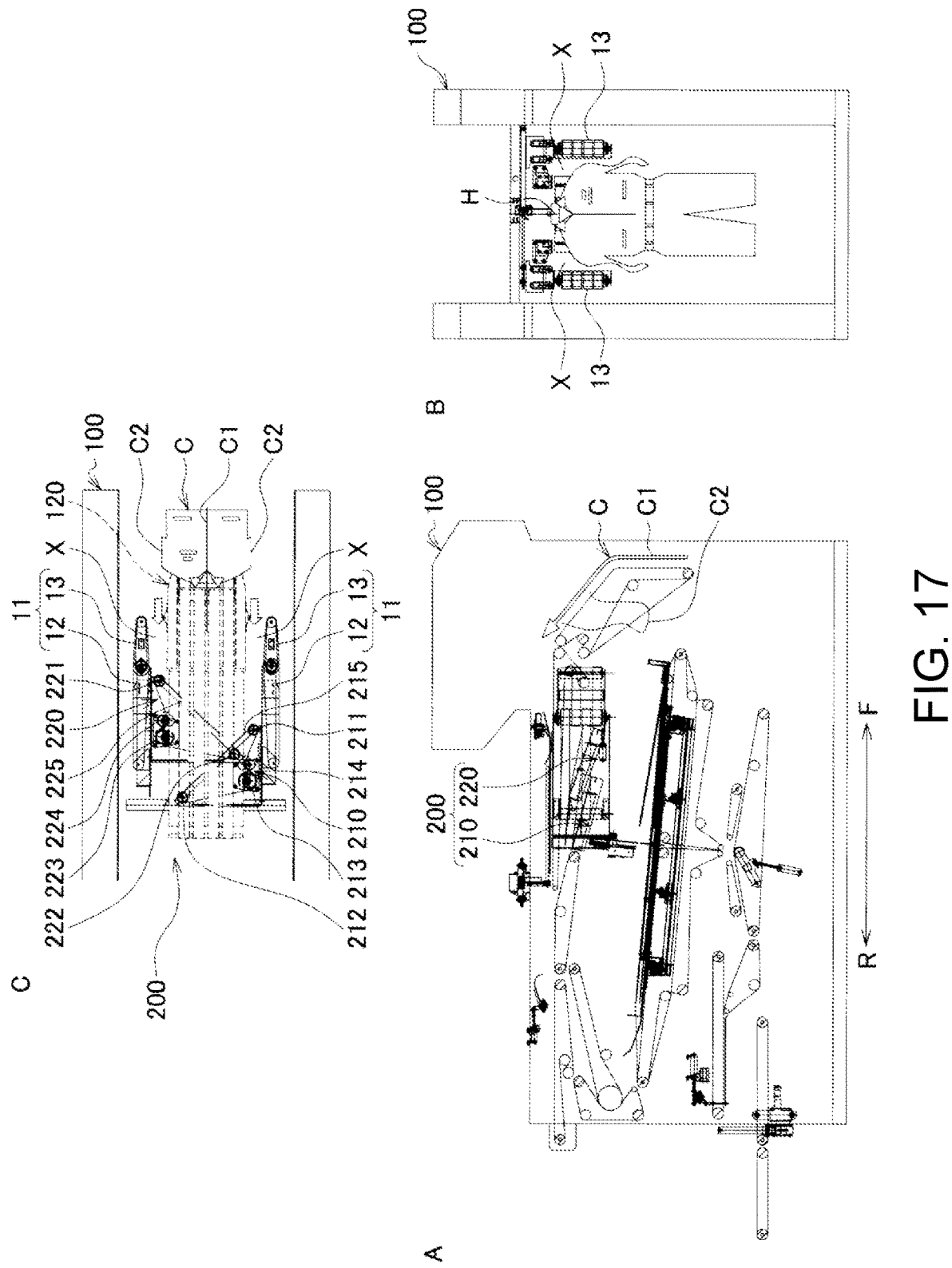
In FIG. 17, A is a side view of the garment folding device for explaining a sleeve back folding step, B is a front view of A, and C is a plan view of A.

A step of performing the so-called chest-revealing folding by the folding device 100 having the above configuration will be described. The so-called chest-revealing folding step is achieved by sequentially performing the following steps. In the sleeve back folding step of folding both sleeve portions C2 and C2 of the garment C so as to overlap the back portion of the garment C, the garment C suspended from the hanger H is disposed on the front end conveyor 110 (refer to A, B, and C of FIG. 17). At that time, since the operator (not illustrated) has selected the step of performing the chest-revealing folding in advance, the moving portions 13 and 13 are disposed substantially parallel to the loading conveyor 120. Therefore, the moving portions 13 and 13 are disposed at positions which do not come into contact with the loading conveyor 120 (refer to C of FIG. 17).

Further, the garment C are transported from the front F to the rear R by the transport of the loading conveyor 120. Since the moving portions 13 and 13 are disposed substantially parallel to the loading conveyor 120, both sleeve portions C2 and C2 of the garment C enter the gaps x and x, respectively (refer to A, B, and C of FIG. 18).

Both sleeve portions C2 and C2 of the garment C which have entered the gaps x and x, respectively, are folded by the right sleeve folding portion 210 and the left sleeve folding portion 220 in the chest-revealing sleeve-fold portion 200. That is, when one of both sleeve portions C2 and C2 comes into contact with the right folding belt 215 near the first right roller 211 disposed in the gap x in a plan view, and thus, one of both sleeve portions C2 and C2 of the garment C is folded in a direction (arrow direction, refer to FIG. 5) in which the right folding belt 215 orbits. Moreover, similar to the one of both sleeve portions C2 and C2, the other of both sleeve portions C2 and C2 of the garment C also comes into contact with the left folding belt 225 near the first left roller 221 disposed in the gap x in a plan view, and thus, the other of both sleeve portions C2 and C2 of the garment C is folded in a direction in which the left folding belt 225 orbits.

Figure 18:
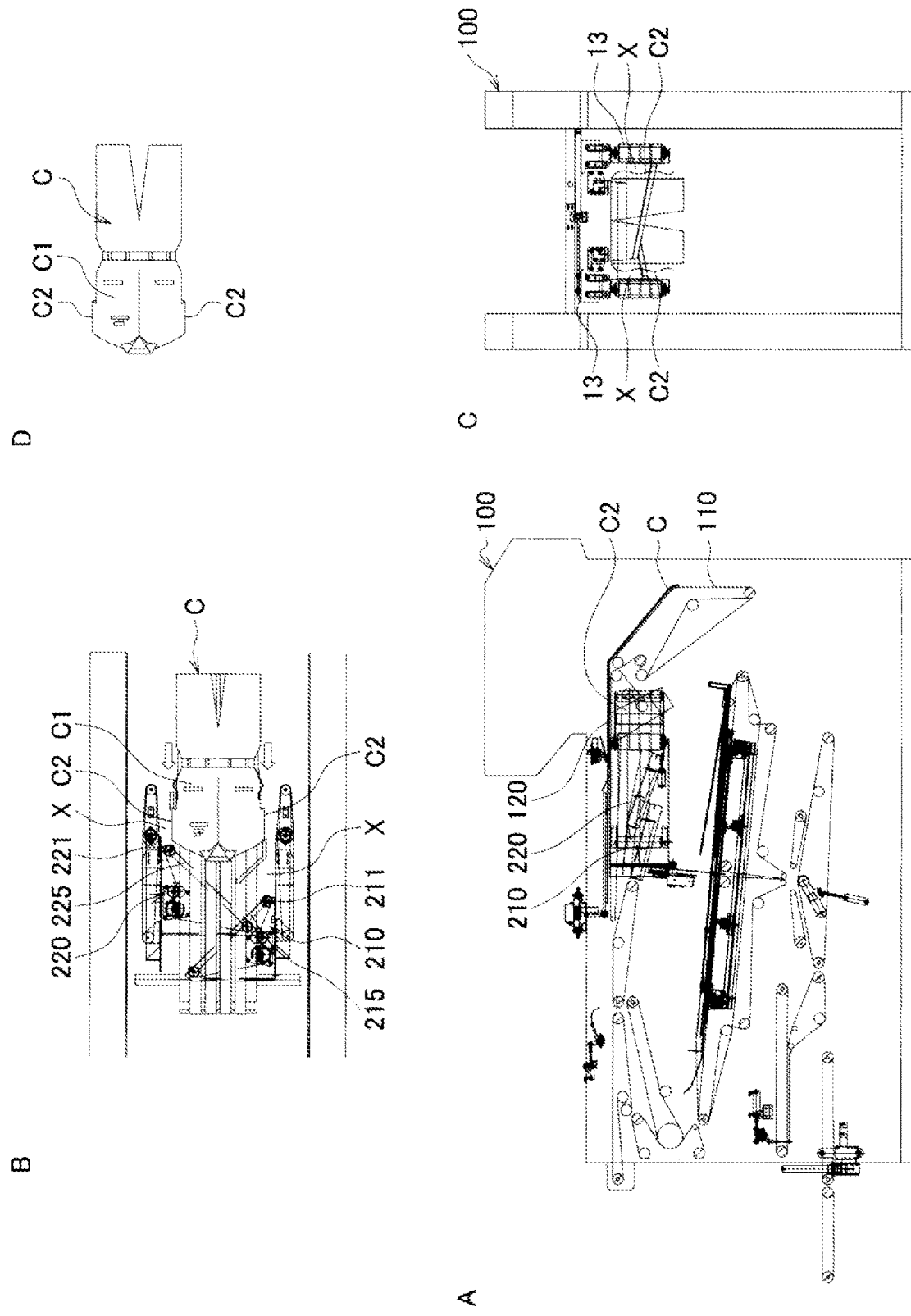
In FIG. 18, A is a side view of the garment folding device in a state in which both sleeve portions of the garment have entered a gap, B is a plan view of A, C is a plan view of A, and D is a plan view of a state in which both sleeve portions of the garment are hung down.

After that, the body portion C1 of the garment C and both sleeve portions C2 and C2 of the garment C folded across the loading conveyor 120 pass through the loading conveyor 120 and are placed on the first conveyor 310, and thus, the back portion of the body portion C1 of the garment C and both sleeve portions C2 and C2 of the garment C overlap each other (refer to D of FIG. 18).

Figure 19:
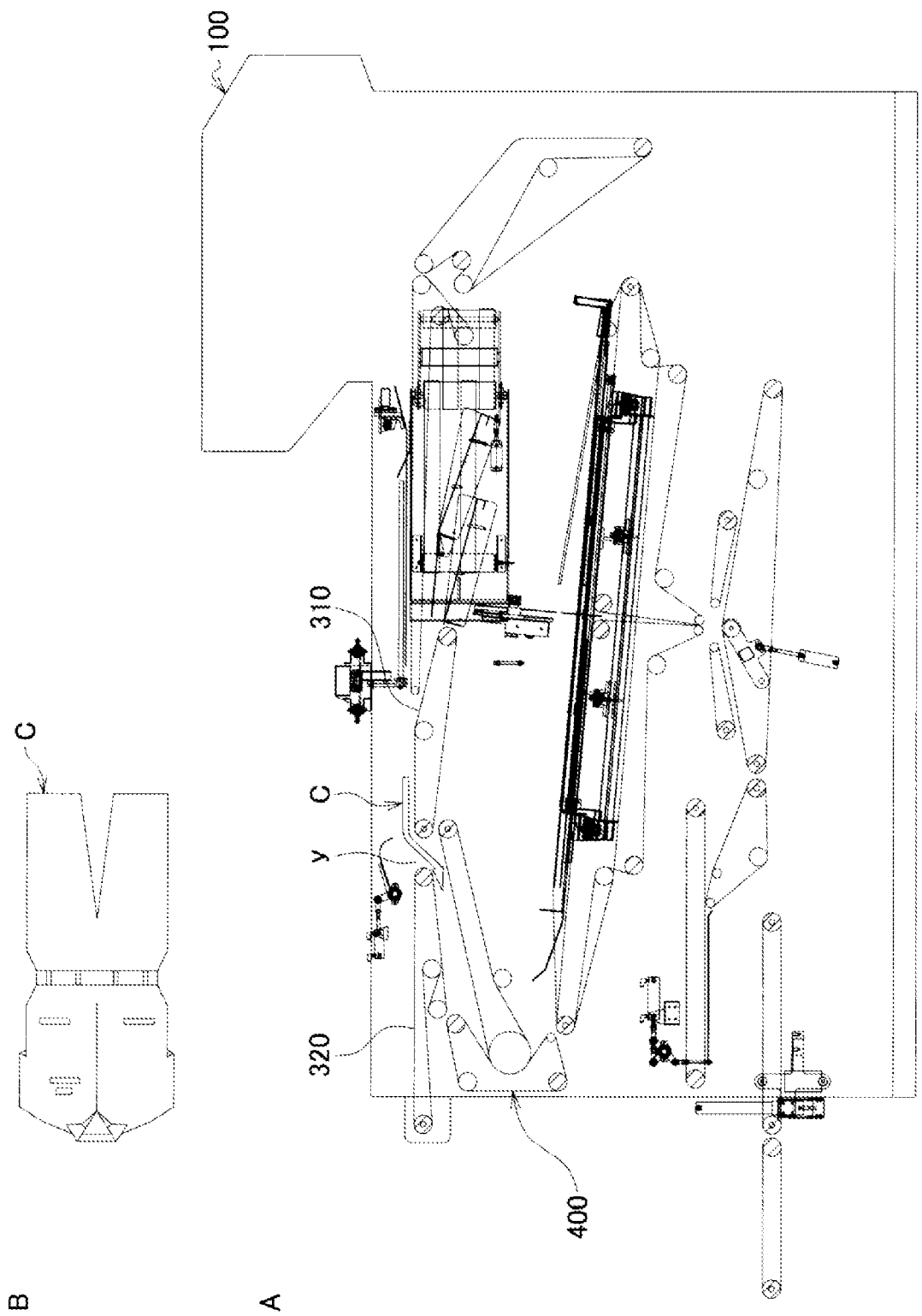
In FIG. 19, A is a side view of the garment folding device in a state where the garment has passed through a gap, and B is a view illustrating the garment in a passed state.

Next, since the gap y between the first conveyor 310 and the second conveyor 320 in the back-revealing folding portion 300 increases, the garment C passes through the gap y (refer to A and B of FIG. 19). The reason why the gap y increases is because an operator (not illustrated has selected the step of performing the chest-revealing folding in advance (refer to A and B of FIG. 19).

Figure 20:
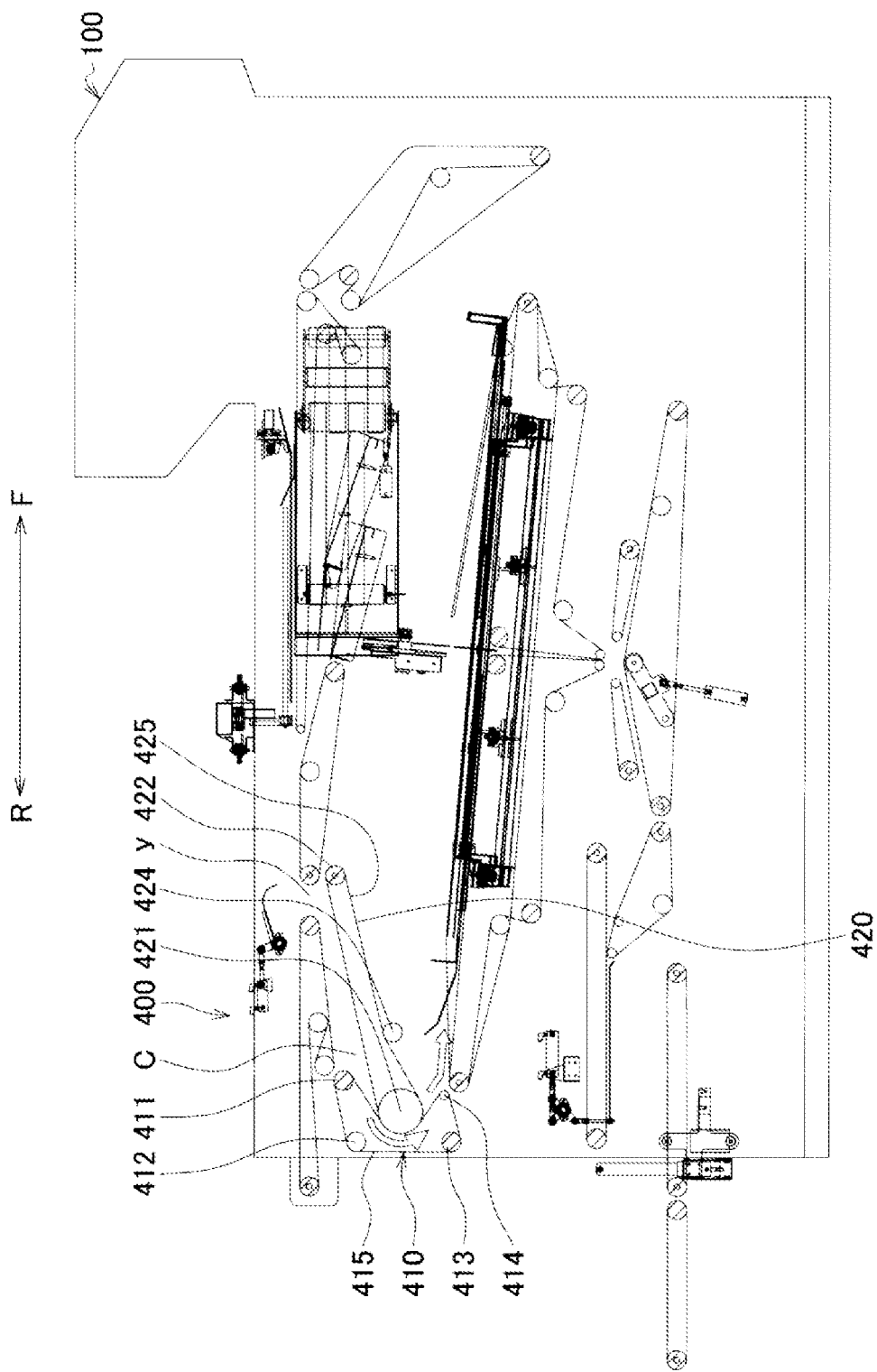
FIG. 20 is a side view of the garment folding device for explaining a garment chest-revealing inversion step.

Next, a garment chest-revealing inversion step will be described. The garment C having both sleeve portions C2 and C2 folded on the back portion of the garment C is inverted so that the garment is turned inside out. As described above, the first inversion belt 415 between the first inversion roller 411 and the fourth inversion roller 414 is pushed to the rear R by the first inversion receiving roller 421, and is bent and disposed to wrap around the first inversion receiving roller 421. Therefore, the garment C which has passed through the gap y is interposed between the first inversion belt 415 and the inversion receiving belt 423 and transported, and thus, the garment C can be turned inside out (refer to FIG. 20).

Figure 21:
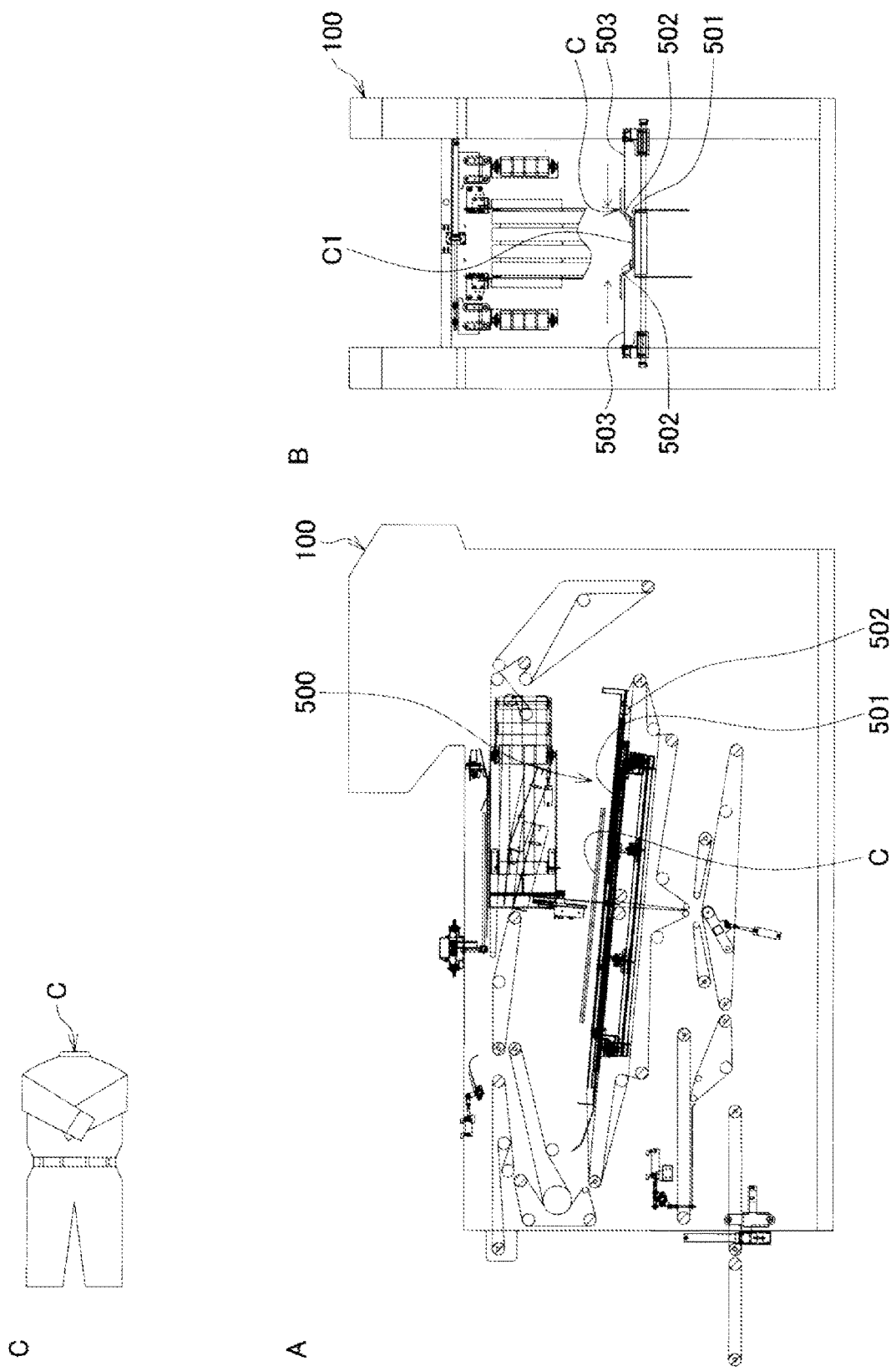
In FIG. 21, A is a side view of the garment folding device for explaining a chest-revealing torso three-folding step, B is a front view of A, and C is a view illustrating the garment which is chest-revealed and torso-folded in three.
Figure 22:
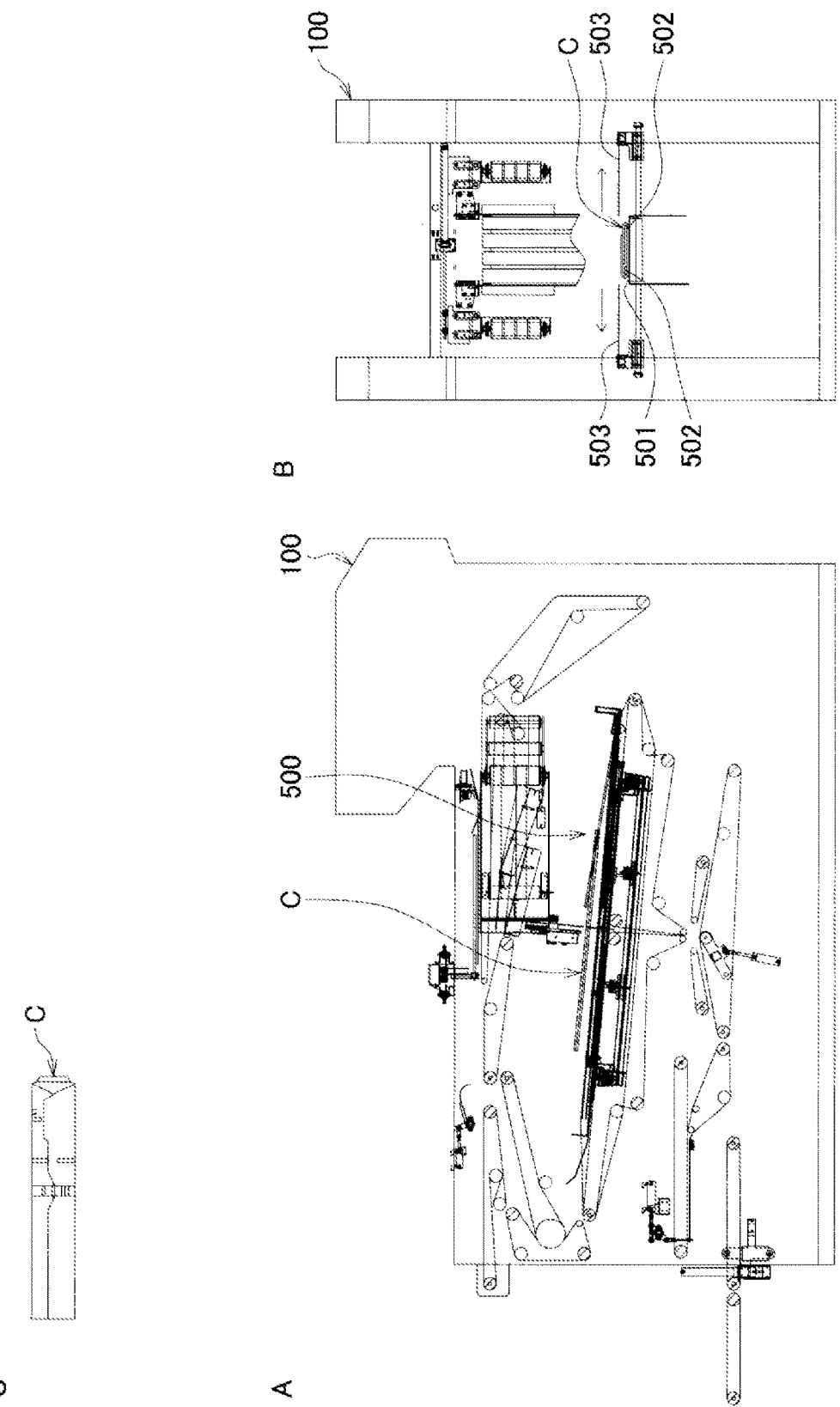
In FIG. 22, A is a side view of the garment folding device for explaining a chest-revealing torso three-folding step, B is a front view of A, and C is a view illustrating the garment which is chest-revealed and of which a torso is folded in three.

Next, a chest-revealing torso three-folding step will be described. The chest-revealing torso three-folding step is a folding step of narrowing the width of the torso C1 of the garment C by folding the garment C at two locations parallel to the length of the garment C, similar to the above-mentioned torso three-folding step (refer to A of FIG. 21). As described above, in order to fold the width of the inverted garment C (refer to C of FIG. 21) in three, the garment is disposed between the pair of torso three-folding gauges 502 and 502 on the torso three-folding conveyor 501 (refer to B of FIG. 21). After that, the torso three-folding knives 503 and 503 disposed on the right and left are operated toward the center of the conveyor 501, respectively, to fold the garment C in three (refer to A, B, and C of FIG. 22).

Figure 23:
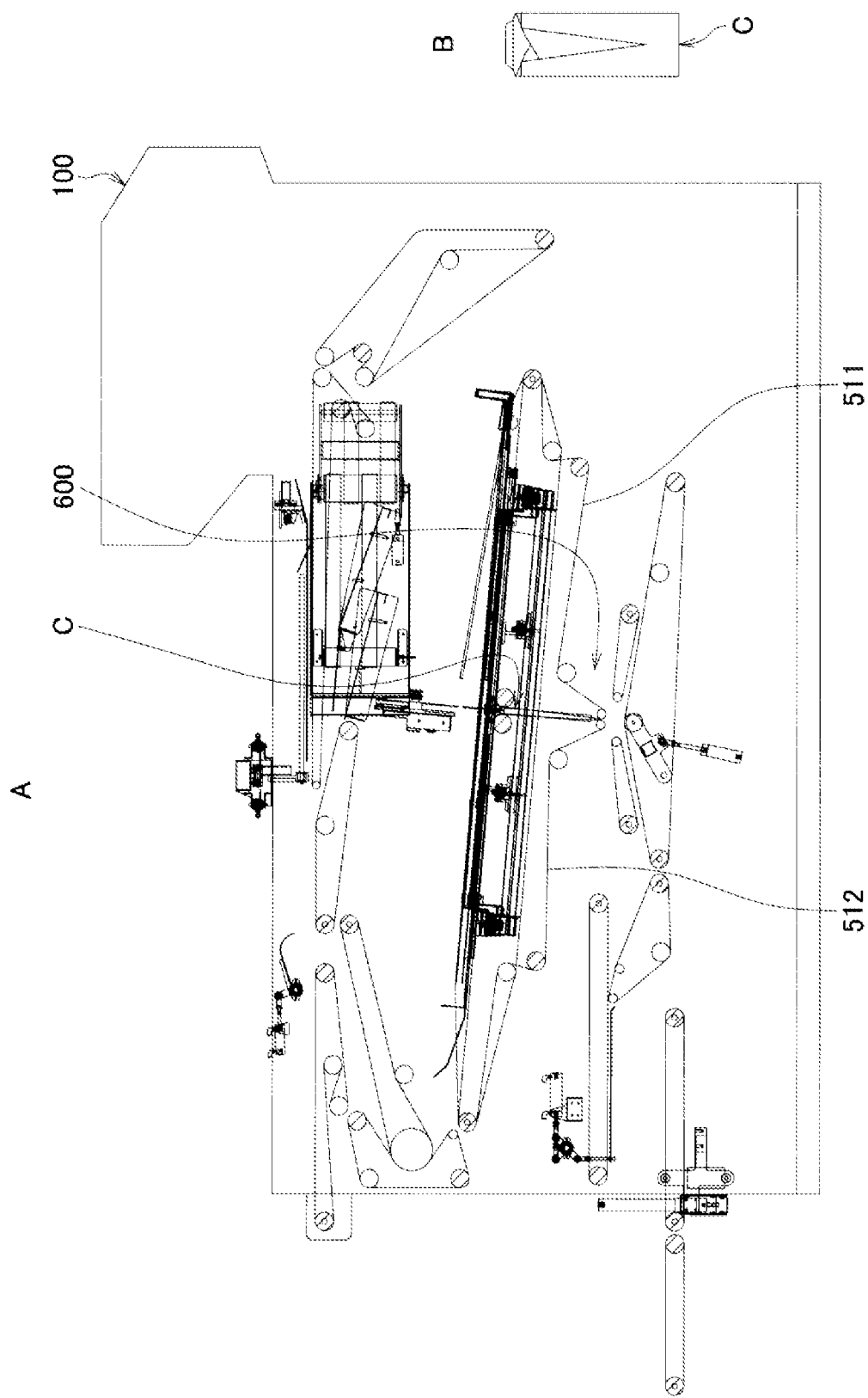
In FIG. 23, A is a side view of the garment folding device for explaining a chest-revealing two-folding step, and B is a view illustrating the garment which is chest-revealed and folded in two.

Next, a chest-revealing two-folding step will be described. The chest-revealing two-folding step is a step of halving the length of the transported garment C in the length direction. As described above, the garment C of which the torso is folded in three is folded in two so as to further shorten the length. That is, when the garment C is transported so as to straddle the gap z between the front conveyor 511 and the rear conveyor 512, and the substantially central portion of the length of the garment C in the length direction is located on the gap z, a transport operation of the garment C is stopped. After that, by pushing down the two-folding knife 601 disposed immediately above the gap z and pushing the garment C into the gap z, the garment C folded in two is pushed into the gap z, and thus, the torso of the garment C is folded in two (refer to A and B of FIG. 23).

Next, a chest-revealing re-folding step will be described. The chest-revealing re-folding step is a step of further reducing the length of the transported garment C in the length direction to about half the length. The length of the garment C whose length in the length direction in the above-mentioned chest-revealing two-folding step is substantially halved is further halved.

The chest-revealing re-folding step is performed by the chest-revealing two-folding portion 700. The chest-revealing two-folding portion 700 further folds the garment C, which is folded in two in the length direction of the garment C by the above-mentioned two-folding portion 600, in two in the length direction. As described above, the chest-revealing two-folding portion 700 has the first chest-revealing two-folding conveyor 710, the second chest-revealing two-folding conveyor 720, the third chest-revealing two-folding conveyor 730, and the ejection unit (not illustrated) for ejecting air. The first chest-revealing two-folding conveyor 710 has a substantially triangular shape in a side view, the second chest-revealing two-folding conveyor 720 is disposed above the front hypotenuse 711 disposed in the front portion of the first chest-revealing two-folding conveyor 710, the first chest-revealing two-folding conveyor 710 has a substantially triangular shape in a side view, and the third chest-revealing two-folding conveyor 730 is disposed above the rear hypotenuse 712 disposed in the rear portion of the first chest-revealing two-folding conveyor 710 (refer to FIG. 8, and A and B of FIG. 24).

The chest-revealing two-folding portion 700 having the above configuration ejects air to the garment C discharged from the gap z between the front conveyor 511 and the rear conveyor 512 from the ejection unit (not illustrated) which ejects the air, and guides the garment C between the first chest-revealing two-folding conveyor 710 and the second chest-revealing two-folding conveyor 720 of the chest-revealing two-folding portion 700 moving in a direction of an arrow a. After that, when a half of the length of the garment C discharged from the gap z further enters between the first chest-revealing two-folding conveyor 710 and the second chest-revealing two-folding conveyor 720, movements of the first chest-revealing two-folding conveyor 710 and the second chest-revealing two-folding conveyor 720 in the direction of the arrow a rotate in the opposite directions (refer to FIG. 24).

Figure 24:
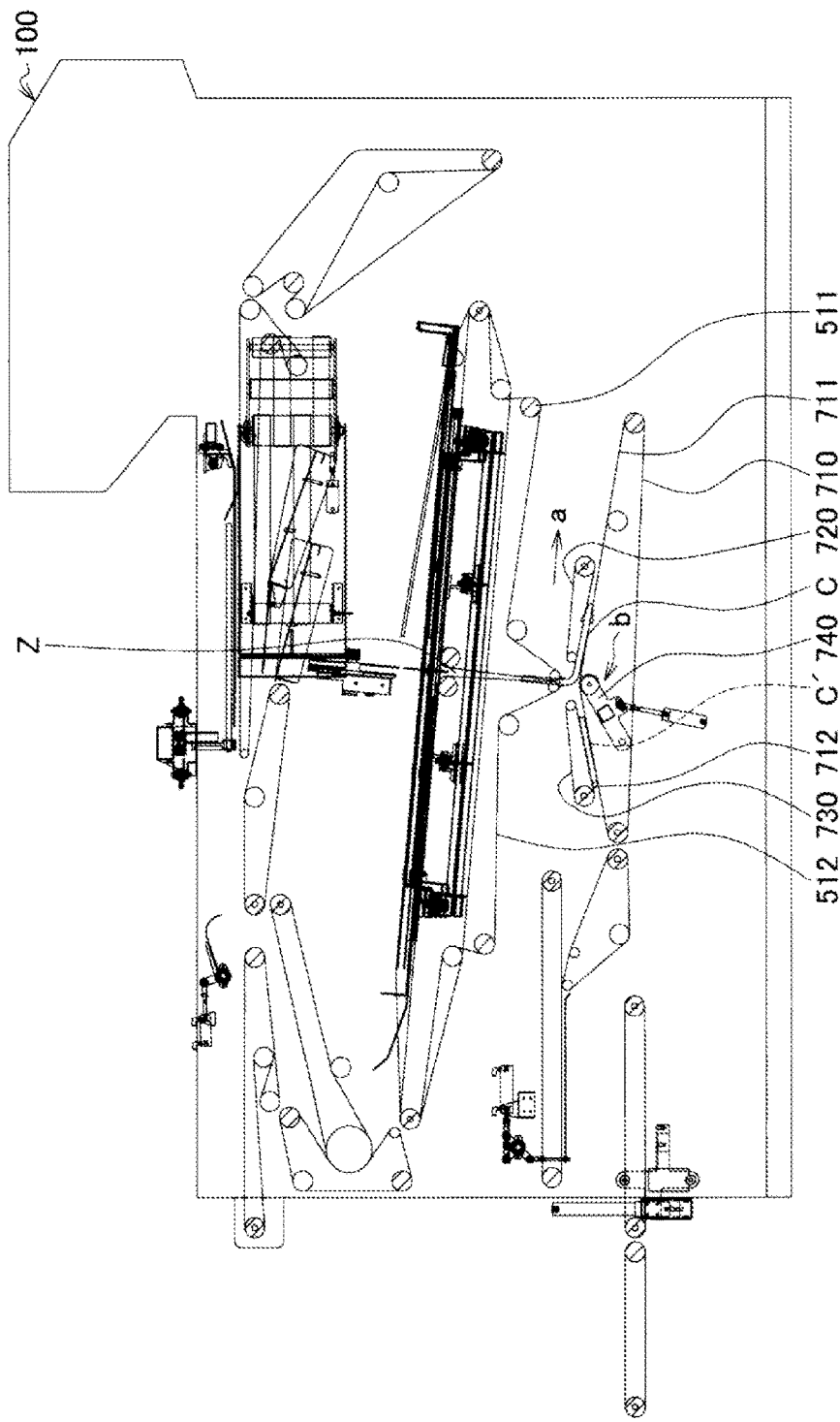
In FIG. 24, A is a side view of the garment folding device for explaining a chest-revealing re-folding step, and B is a view illustrating the garment which is chest-revealed and re-folded in two.
Figure 24:

After that, the first chest-revealing two-folding conveyor 710, the second chest-revealing two-folding conveyor 720, and the third chest-revealing two-folding conveyor 730 move in a direction of an arrow b, a garment C' which is halved in length is interposed between the first chest-revealing two-folding conveyor 710 and the third chest-revealing two-folding conveyor 730, and the garment C is folded in two in the length direction (length of the garment C) (refer to FIG. 24).

Figure 25:
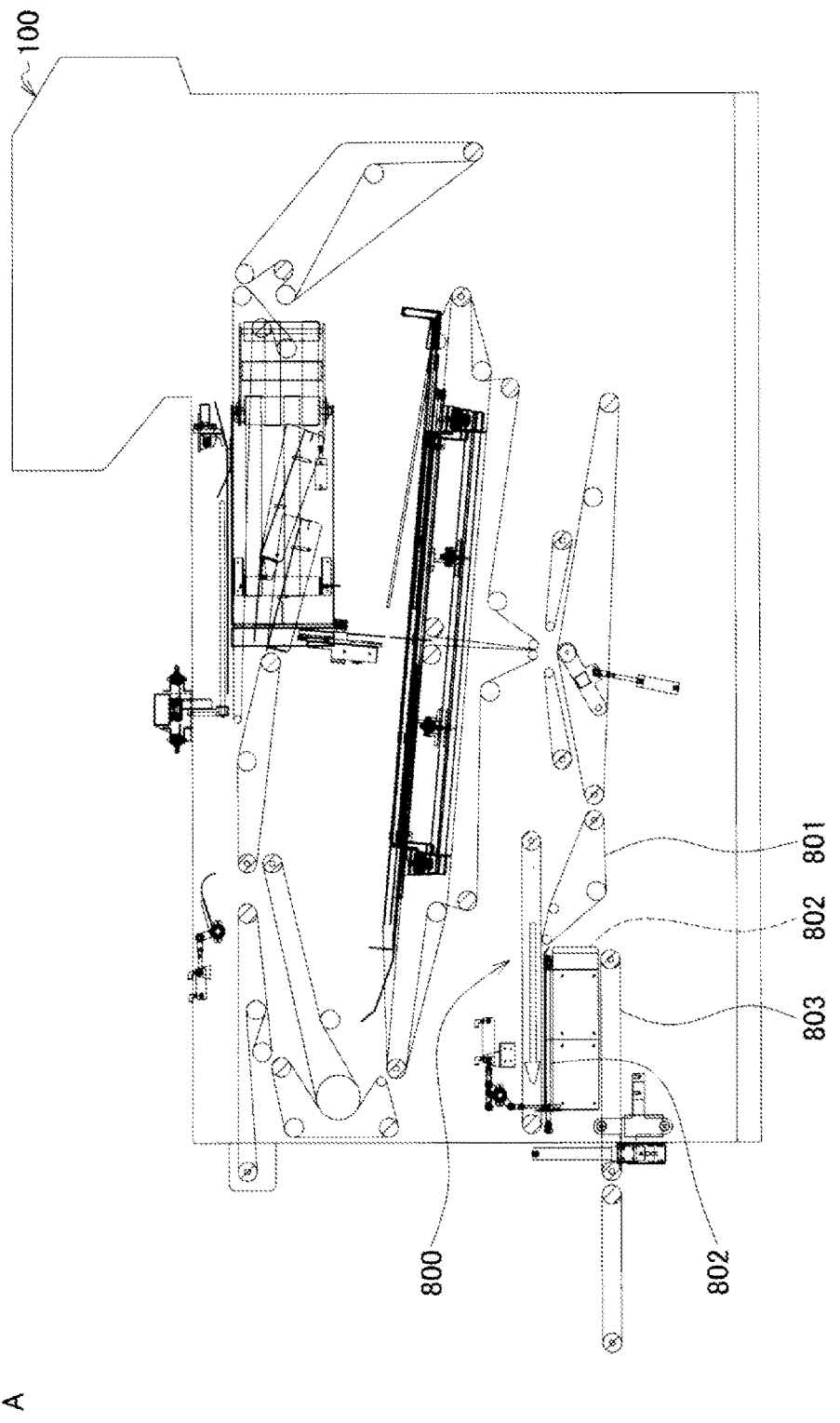
In FIG. 25, A is a side view of the garment folding device illustrating the stacking step, and B is a view illustrating the stacked garment.
Figure 25:
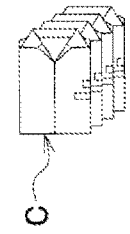

After that, the garment C folded in two is transported to the stacking portion 800. That is, the garment C is further transported to the rear R by the stack first stacking conveyor 801 and disposed on the closed drop plate portion 802, and when the drop plate portion 802 is opened, and the folded garment C is stacked on the second stacking conveyor 803 (refer to FIG. 25).

What is claimed is:

1. A sleeve-folding assistance device for assisting a back-revealing sleeve-folding device, the sleeve-folding assistance device comprising:
    a pair of right and left sleeve guide portions, that when disposing a body portion of a garment having the body portion and two sleeve portions on a loading conveyor to transport the garment from a front to a rear, are configured to move and approach each of two sides of the loading conveyor so as to guide each of the sleeve portions of the garment that are hanging down on each side of the loading conveyor, respectively, to a sleeve-folding device for performing a back-revealing sleeve-folding,
    wherein when the body portion is transported from the front to the rear on the loading conveyor, the pair of right and left sleeve guide portions approach each respective side of the loading conveyor and transport the sleeve portions from the front to the rear on the loading conveyor, and the pair of right and left sleeve guide portions lift each of the sleeve portions of the garment, respectively.

2. The sleeve-folding assistance device for assisting a back-revealing sleeve-folding device according to claim 1,
    wherein the pair of right and left sleeve guide portions is constructed with a right sleeve guide portion and a left sleeve guide portion,
    wherein the right sleeve guide portion has:
        a right base portion which is disposed at a predetermined gap on a right side of the loading conveyor, and
        a right moving portion which is rotatably disposed on the right base portion, and
    wherein the left sleeve guide portion has:
        a left base portion, which is disposed at a predetermined gap on a left side of the loading conveyor, and
        a left moving portion, which is rotatably disposed on the left base portion,
    when the right moving portion and the left moving portion rotate and approach the loading conveyor, each of the sleeve portions of the garment are lifted by the right moving portion and the left moving portion, respectively, and each of the sleeve portions are further placed on the left base portion and the right base portion, respectively, to guide each of the sleeve portions of the garment to the back-revealing sleeve-folding device.

3. The sleeve-folding assistance device for assisting a back-revealing sleeve-folding device according to claim 2,
    wherein each of the right base portion and the left base portion further has a flip-up portion for lifting each of the sleeve portions of the garment, respectively, and
    each of the sleeve portions placed on the right base portion and the left base portion, respectively, are further flipped up by the flip-up portion of the right base portion and the flip-up portion of the left base portion.

4. A back-revealing sleeve-folding device, comprising:
    the sleeve-folding assistance device for assisting a back-revealing sleeve-folding device according to claim 1,
    wherein each of the sleeve portions of the garment are lifted by the sleeve-folding assistance device, and thereafter, each of the sleeve portions are folded to overlap a chest portion of the garment.

5. A folding device, comprising:
    the back-revealing sleeve-folding device according to claim 4.

* * * * *